(12) United States Patent
Hosonuma et al.

(10) Patent No.: US 6,542,788 B2
(45) Date of Patent: Apr. 1, 2003

(54) ROBOT APPARATUS CAPABLE OF SELECTING TRANSMISSION DESTINATION, AND CONTROL METHOD THEREFOR

(75) Inventors: Naoyasu Hosonuma, Saitama (JP); Noriyuki Fukushima, Tokyo (JP); Kazufumi Oyama, Saitama (JP)

(73) Assignee: Sony Corporation, Tokyo (JP)

( * ) Notice: Subject to any disclaimer, the term of this patent is extended or adjusted under 35 U.S.C. 154(b) by 59 days.

(21) Appl. No.: 09/750,994

(22) Filed: Dec. 29, 2000

(65) Prior Publication Data

US 2001/0021882 A1 Sep. 13, 2001

(30) Foreign Application Priority Data

Dec. 31, 1999 (JP) ............................................. 11-377347

(51) Int. Cl.⁷ .............................................. G06F 19/00
(52) U.S. Cl. ...................... 700/245; 700/246; 700/247; 700/248; 700/249; 700/250; 700/257; 318/568.12; 318/800; 901/1; 901/46; 901/47; 701/23
(58) Field of Search ................................ 700/245, 246, 700/247, 248, 249, 250, 257, 260, 261, 262, 275, 253, 264, 302; 901/1, 46, 47; 318/568.12, 800; 701/23; 707/104.1; 53/503

(56) References Cited

U.S. PATENT DOCUMENTS

| 4,783,799 A | * | 11/1988 | Maass | ........................ 180/211 |
| 5,525,882 A | * | 6/1996 | Asaka et al. | ........... 318/568.12 |
| 5,715,397 A | * | 2/1998 | Ogawa et al. | ................. 706/13 |
| 5,920,337 A | * | 7/1999 | Glassman et al. | ........... 340/436 |
| 5,949,978 A | * | 9/1999 | Kondo et al. | ................ 250/253 |
| 6,330,494 B1 | * | 12/2001 | Yamamoto | .................. 700/245 |

FOREIGN PATENT DOCUMENTS

| JP | 05091556 A | * | 4/1993 |
| JP | 405300450 A | * | 11/1993 |

OTHER PUBLICATIONS

Nikam, A fault diagnostic system of an Unmanned autonomous mobile robot, 1997, Internet, pp. 1–78.*
Li et al., Simulation of teh data transmission for an ROV, 1996, IEEE, pp. 508–512.*
Bischoff et al., Machine vision for intelligent robot, 1998, Internet, 1–10.*
Makiishi et al., Sensor–based path–planning of multiple mobile robots to overcome large transmission delays in teleoperation, 1999, IEEE, pp. IV–656–IV–661.*

* cited by examiner

*Primary Examiner*—William A. Cuchlinski, Jr.
*Assistant Examiner*—McDieunel Marc
(74) *Attorney, Agent, or Firm*—Frommer Lawrence & Haug LLP; William S. Frommer; Glenn F. Savit

(57) ABSTRACT

A robot apparatus such as an entertainment robot is configured to select a transmission destination at which a communication appliance is located, and transmits predetermined information to the selected transmission destination. The predetermined information may be a self-diagnostic result or information concerning its surrounding environment. If the transmission fails, the robot apparatus selects an alternative transmission destination whereat another communication appliance is located, and transmits the information to the alternative destination.

20 Claims, 21 Drawing Sheets

| node 100 | | | | | | | | |
|---|---|---|---|---|---|---|---|---|
| | INPUT EVENT NAME | DATA NAME | DATA RANGE | A | B | C | D ... | n |
| | | | | node 120 | node120 | node 1000 | | node 600 |
| | | | | ACTION 1 | ACTION 2 | MOVE BACK | | ACTION 4 |
| 1 | BALL | SIZE | 0, 1000 | 30% | | | | |
| 2 | PAT | | | | 40% | | | |
| 3 | HIT | | | | 20% | | | |
| 4 | MOTION | | | | | | | |
| 5 | OBSTACLE | DISTANCE | 0, 100 | | | 50% | | |
| 6 | | JOY | 50, 100 | | | 100% | | |
| 7 | | SUPRISE | 50, 100 | | | | | |
| 8 | | SADNESS | 50, 100 | | | | | |

Columns A–n: PROBABILITY OF TRANSITION TO ANOTHER NODE
Rows: TRANSITION DESTINATION NODE / OUTPUT ACTION

ROBOT APPARATUS CAPABLE OF SELECTING TRANSMISSION DESTINATION, AND CONTROL METHOD THEREFOR

BACKGROUND OF THE INVENTION

1. Field of the Invention

The present invention relates to a robot apparatus and a control method of the robot apparatus, and more particularly, is suitably applicable, for example, to a pet robot.

2. Description of the Related Art

The applicant of the present invention has recently proposed and developed a quadruped walking type pet robot which takes actions in response to a command from a user and dependently on a surrounding environment. Such a pet robot has a form resembling to that of a dog or a cat bred in a general household and autonomously acts dependently on a command from a user or a surrounding environment.

In recent years where rapid progresses have been made in a technology for information communication through telephone networks such as public telephone and portable telephones, internets and communications satellite networks, accurate realtime transmission of various kinds of information is possible by utilizing images and sounds.

It is therefore conceived that an amusement property of a pet robot can be enhanced by incorporating a pet robot with a communicating function which permits external communication through various kinds of information transfer paths such as communications satellite networks so that a user can recognize a state of the pet robot and obtain information useful for the user from the pet robot by utilizing this communicating function.

SUMMARY OF THE INVENTION

In view of the foregoing, an object of this invention is to provide a robot apparatus and a control method for the robot apparatus which can enhance an amusement property.

The foregoing object and other objects of the invention have been achieved by the provision of a robot apparatus which comprises selecting means for selecting a transmission destination and transmitting means for transmitting predetermined information to the transmission destination selected by the selecting means.

As a result, the robot apparatus can remarkably enhance a probability of notification since the robot apparatus selects the transmission destination.

Furthermore, the robot apparatus according to the present invention comprises also information acquiring means for acquiring information of a surrounding environment and/or an internal state and transmitting means for transmitting information acquired by the above described information acquiring means to a predetermined transmission destination. As a result, the robot apparatus is capable of communicating even when the robot apparatus is at a location which is not near the transmission destination.

Furthermore, a control method for robot apparatus according to the present invention is configured by selecting a transmission destination and then transmitting predetermined information to the above described selected transmission destination. As a result, the control method for robot apparatus is capable of remarkably enhancing a probability of notification to the transmission destination since this method has selectivity of the transmission destination.

Furthermore, the control method for robot apparatus according to the present invention is configured by acquiring information of a surrounding environment and/or an internal state and then transmitting the above described information to a predetermined transmission destination. As a result, this control method for robot apparatus allows a robot apparatus to communicate even when the robot apparatus is not near the transmission destination.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 7 is a conceptional diagram showing a state transition table;

DETAILED DESCRIPTION OF THE EMBODIMENT

Preferred embodiments of this invention will be described with reference to the accompanying drawings:

(1) Configuration of Pet Robot according to Embodiment

Figure 1:
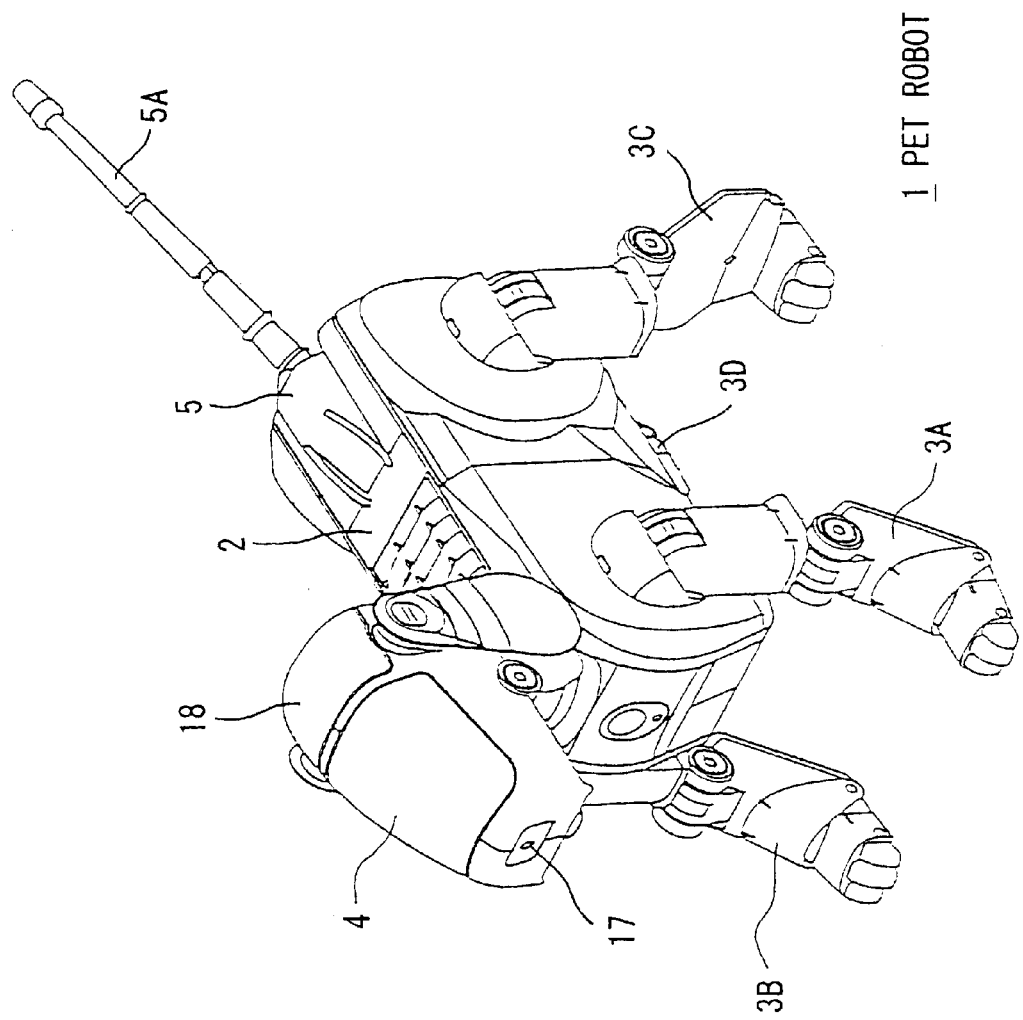
FIG. 1 is a perspective view showing an appearance configuration of a pet robot according to the present embodiment.

In FIG. 1, reference numeral 1 denotes a pet robot as a whole according to the embodiment which is configured by coupling leg member units 3A to 3D with front, rear, left and right portions of a body member unit 2, and coupling a head member unit 4 and a tail member unit 5 with a front end and a rear end respectively of the body member unit 2.

Figure 2:
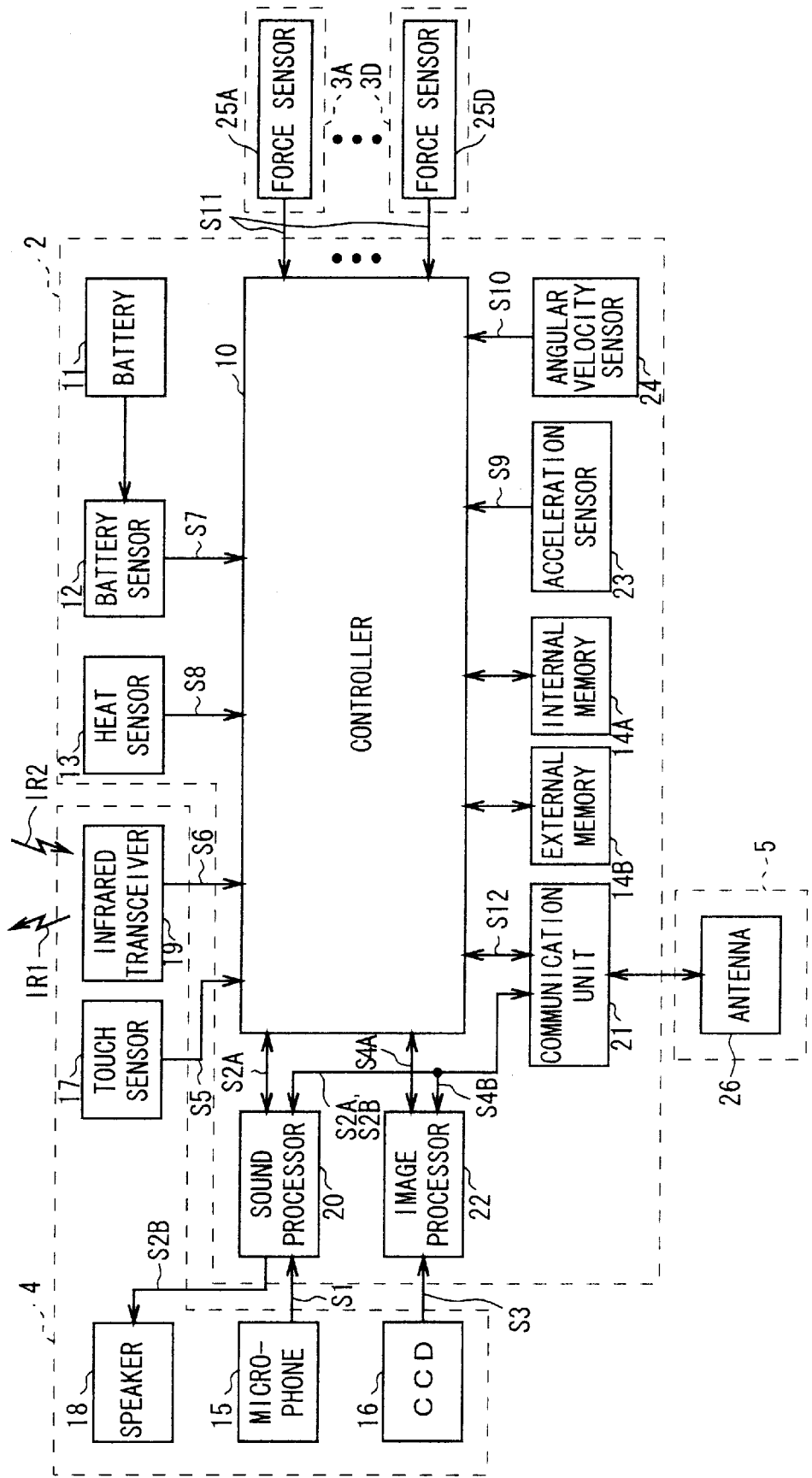
FIG. 2 is a block diagram showing a circuit configuration of the pet robot according to the present embodiment.

In this case, accommodated in the body member unit 2 are a controller 10 which controls an action of the pet robot 1 as a whole, a battery 11 which serves as a power source for the pet robot 1, a battery sensor 12, a heat sensor 13, an internal memory 14A, detachably charged external memory 14B or the like as shown in FIG. 2.

Disposed at predetermined locations of the head member unit 4 are a microphone 15 which corresponds to an "ear" of the pet robot 1, a charge coupled device (CCD) camera 16 which corresponds to an "eye", a touch sensor 17, a speaker 18 which corresponds to a "mouth", an infrared ray receiver 19 which transmits and receiver an infrared ray signal, and so on.

Furthermore, actuators (not shown) are disposed in joint portions of the leg member units 3A to 3D, coupled portions of the leg member units 3A to 3D and the body member unit 2, coupled portions between the head member unit 4 and the body member unit 2, coupled portions between the tail member unit 5 and the body member unit 2, and so on respectively.

The microphone 15 of the head member unit 4 collects external sounds such as speech emitted from a user, music and sounds, and sends out a collected sound signal S1 to a sound processor 20. On the basis of the collected sound signal S1 supplied from the microphone 15 and sound information which is supplied from a communication unit 21 as described later, the sound processor 20 recognizes a meaning of the speech or the like collected by way of the microphone 15 or speech or the like sent from outside through a telephone network and sends out a recognition result to the controller 10 and the communication unit 21 as a sound recognition signal S2A. Furthermore, the sound processor 20 generates a synthetic sound under control by the controller 10 and sends out this sound to the speaker 18 and the communication unit 21 as a sound signal S2B.

The CCD camera 16 of the head member unit 4 picks up an image of a surrounding condition and sends out an obtained image pickup signal S3 to an image processor 22. On the basis of the image pickup signal S3 given from the CCD camera 16 and image information supplied from the communication unit 21 as described later, the image processor 22 recognizes an external condition of an image which has been picked up by the CCD camera 16 and contents of an image externally supplied through a telephone network and sends out a recognition result to the controller 10 as an image recognition signal S4A. Furthermore, the image processor 22 performs predetermined image processing of the image pickup signal S3 from the CCD camera 16 under control by the controller 10 and sends out an obtained image signal S4B to the communication unit 21.

Furthermore, disposed at an upper portion of the head member unit 4 is a touch sensor 17 which detects a pressure produced by a physical spurring such as "tapping" or "striking" from the user and sends out a detection result to the controller 10 as a pressure detection signal S5. Furthermore, disposed on the head member unit 4 is an infrared ray transceiver 19 which receives an infrared ray signal R11 as a controller signal given from the user by way of an infrared ray remote controller (not shown) and sends out a reception result to the controller 10 as an infrared ray reception signal S6.

Furthermore, the battery sensor 12 of the body member unit 2 detects a residual energy amount of the battery 11, sends out a detection result to the controller 10 as a battery residual amount signal S7, and the heat sensor 13 detects heat in the pet robot 1 and sends out a detection result to the controller 10 as a heat detection signal S8.

Furthermore, an acceleration sensor 23 of the body member unit 2 detects an acceleration in each direction of three axes (X axis, Y axis and Z axis) in a unit of a few dozens of milliseconds and sends out a detection result to the controller 10 as an acceleration detection signal S9. Furthermore, an angular velocity sensor 24 detects a rotating angular velocity in each direction of three angles (angle R, angle P and angle Y) in a unit of few dozens of milliseconds and sends out a detection result to the controller as an angular velocity detection signal S10.

Furthermore, attached to the leg member units 3A to 3D are a plurality of force sensors 25A to 25D for detecting pressures applied from outside, which detect a magnitude of a pressure applied from the user, for example, and send out a detection signal to the controller 10 as a pressure detection signal.

On the other hand, accommodated in a tail part 5A of the tail member unit 5 is an antenna 26 which is electrically connected to the communication unit 21 of the body member unit 2.

Under control by the controller 10 and by way of the antenna 26, the communication unit 21 communicates with an outside through a telephone network or a network exclusively for an internet, radio signal, infrared ray signal or the like, sends out obtained image information to the image processor 22, sends out sound information such as a sound or music to the sound processor 20, and sends out information such as a command from the outside and text data to the controller 10 as reception information signal S12.

Figure 3:
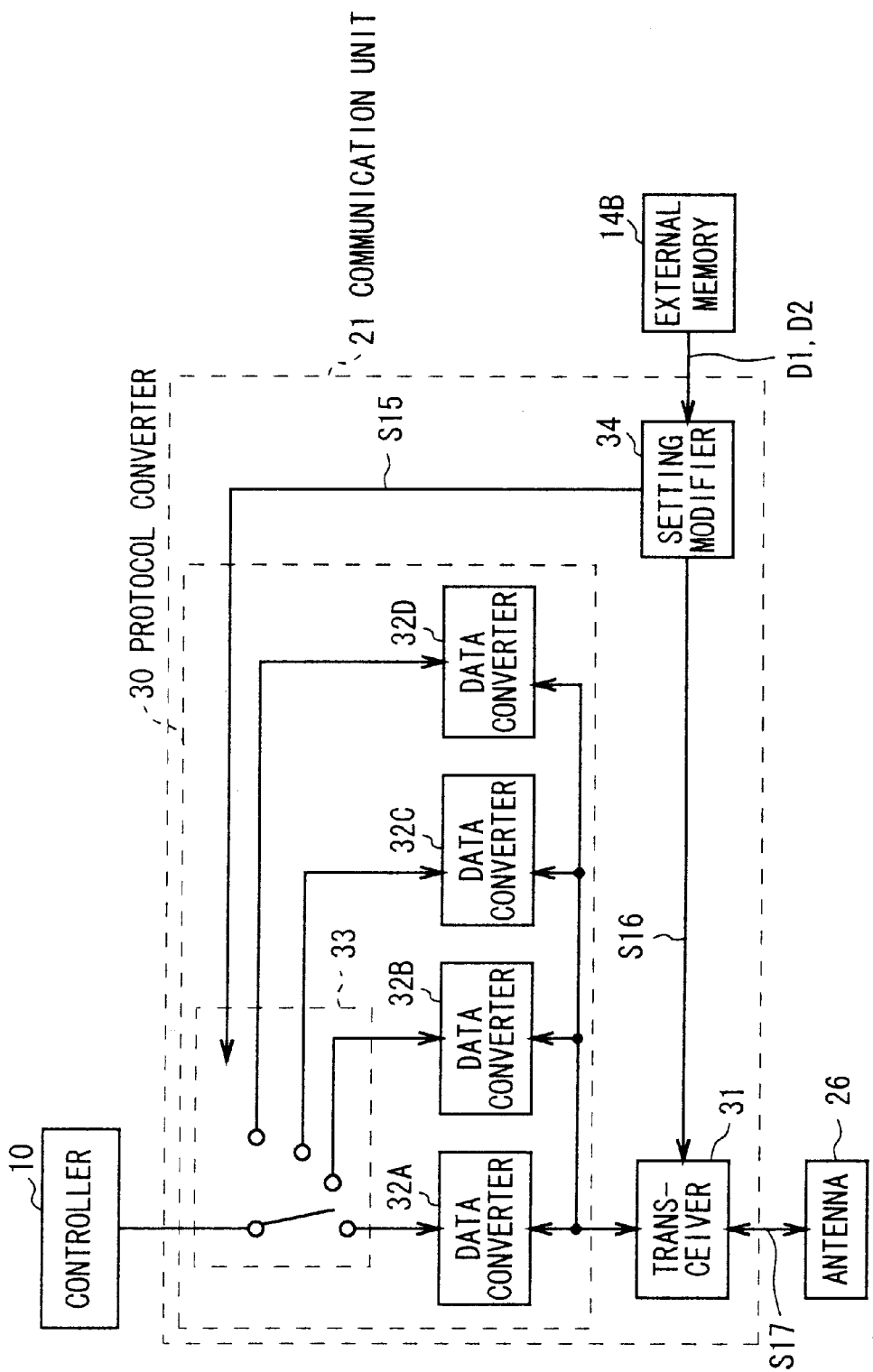
FIG. 3 is a block diagram showing a detailed configuration of a communication unit shown in FIG. 2.

Actually, the communication unit 21 is configured by connecting a protocol converter 30 and a transceiver 31 in series between the controller 10 and the antenna 26 as shown in FIG. 3. The protocol converter 30 comprises data converters 32A to 32D disposed so as to correspond to protocols consisting of those for telephones, electronic mails, facsimiles and pocket bells, and is configured so that only one of the plurality of data converters 32A to 32D which is selected by switching control of a switch circuit 33 is connected between the controller 10 and the transceiver 31.

Stored in the external memory 14B (FIG. 2) removably disposed in the body member unit 2 are a transmission destination list D1 which describes names, addresses or the like of users respectively, and a protocol list D2 which describes protocols for communication modes (telephone, electronic mail, facsimile, pocket bell or the like) of transmission destinations respectively so that data can be sent out to a setting modifier 34 in the communication unit 21 under control by the controller 10 as occasion demands.

The setting modifier 34 sends out a switching selection signal S15 to the switch circuit 33 on the basis of the protocol list D2 obtained from the external memory 14B and sends out a selection determination signal S16 to the transceiver 31 on the basis of the transmission destination list D1 obtained from the external memory 14B. The switch circuit 33 switches connection to the data converters 32A to 32D corresponding to the protocol of a communication mode at the transmission destination in correspondence to the switch selection signal S15 given from the setting modifier 34 and the transceiver 31 determines a transmission destination user together with an address in correspondence to the selection determination signal S16 given from the setting modifier 34.

Accordingly, the pet robot 1 is configured to be capable of converting the image information and sound information supplied from the controller 10 into a data format corresponding to the communication mode of the transmission destination with selected data converters 32A to 32D and then transmitting the information as a transmission data S17 to a communication mode which is an external transmission destination by way of the antenna 26 through the telephone network or the network exclusively for internet, the radio signal or the infrared ray signal.

The controller 10 judges a surrounding condition as well as presence or absence of a command from the user and a spurring from the user on the basis of the sound signal S1, the image signal S3, the pressure detection signal S5, the battery residual amount signal S7, the heat detection signal S8, the acceleration detection signal S9, the angular velocity detection signal S10 and the output detection signal S11 or the like which are given from the microphone 15, the CCD camera 16, the touch sensor 17, the battery sensor 12, the heat sensor 13, the acceleration sensor 23, and angular velocity sensor 24 and the force sensors 15A to 25D.

On the basis of a result of judgement, a control program preliminarily stored in the internal memory 14A, various kinds of control data preliminarily stored in the external memory 14B or the like, the controller determines an action to be taken next, and drives required actuators (not shown) on the basis of a determined result, thereby allowing the pet robot to take an action or motion of swinging the head member unit 4 up, down, left and right, moving the tail portion 5A of the tail member unit 5 or walking while driving the leg member units 3A to 3D. In description that follows, a collection of motions will be defined as an action.

At this time, the controller 10 controls the sound processor 20, the image processor 22 and/or the infrared ray receiver 19, thereby outputting a sound on the basis of sound information from a communicating mate which is taken via the communication unit 21 or a synthetic sound which is generated by the above described sound processor 20 through the speaker 18, flickering a light emitting diode (LED) (not shown) disposed at the location of "eye" of the pet robot 1 and emitting an infrared ray signal IR2 from the infrared ray receiver 19 for controlling an external appliance.

Furthermore, the controller 10 controls the communication unit 21 as occasion demands, thereby allowing the pet robot to transmit sound information on the basis of the sound signal from the sound processor 20, image information on the basis of the image processor 22 and command information generated by the controller 10 itself to the communicating mate in accordance with an external operation or the like.

Accordingly, the pet robot 1 is configured to be capable of taking an action and a motion matched with a surrounding environment and a command from the user or the communicating mate on the basis of the above described surrounding environment and command.

(2) Software Configuration of Control Program

Now, description will be made of specific processings by the controller 10 in this pet robot.

Processing functions of the controller 10 can be classified into a state recognizing mechanism section 40 which recognizes external and internal states, a feeling and instinct model section 41 which determines a feeling state and an instinct states on the basis of a recognition result of the state recognizing mechanism section 40, an action determining mechanism section 42 which determines successive action and motion on the basis of the recognition result of the state recognizing section 40 and an output from the feeling and instinct model section 41, a posture transition mechanism section 43 which sets up a series of action plans for the pet robot 1 to take the action and motion determined by the action determining mechanism section 42, and a control mechanism section 44 which controls actuators (not shown) on the basis of the action plans set up by the posture transition mechanism section 43.

These state recognizing mechanism section 40, feeling instinct model section 41, action determining mechanism section 42, posture determining mechanism section 43 and control mechanism section 44 will be described in detail below.

(2-1) Processings by State Recognizing Mechanism section 40

On the basis of the sound signal S1, the image signal S3, the pressure detection signal S5, the battery residual amount signal S7, the heat detection signal S8, the acceleration detection signal S9, the angular velocity signal S10 and the force detection signal S11 which are given from the microphone 15, the CCD camera 16, the touch sensor 17, the battery sensor 12, the heat sensor 13, the acceleration sensor 23, the angular velocity sensor 24 and the force sensors 25A to 25D, the state recognizing mechanism section 40 recognizes a specific state and informs a recognition result to the feeling and instinct model section 41 and the action determining mechanism section 42 as state recognition information 20.

Actually, the state recognizing mechanism section 40 always monitors the sound signal S1 given from the microphone 15 (FIG. 2), recognizes that a command is given when the state recognizing mechanism section 40 detects, as a spectrum of the above described sound signal S1, a spectrum which has a musical scale identical to that of a command sound which is output from a sound commander in correspondence to a command such as "walk", "prostrate" or "chase a ball", and informs a recognition result to the feeling and instinct model section 41 and the action determining mechanism section 42.

Furthermore, the state recognizing mechanism section 40 always monitors the image signal S3 given from the CCD camera 16 (FIG. 2), recognizes that "a ball is present" or "a wall is present" when the state recognizing mechanism section 40 detects, for example, "something red and round" or "a plane perpendicular to the ground and higher than a predetermined height" in an image formed on the basis of the above described image signal S3 and informs a recognition result to the feeling and instinct model section 41 and the action determining mechanism section 42.

Furthermore, the state recognizing mechanism section 40 always monitors the pressure detection signal S5 given from the touch sensor 17 (FIG. 2), recognizes that the pet robot is "struck (scolded)" when the state recognizing mechanism section 40 detects a pressure not lower than a predetermined threshold value and for a short time (shorter than 2 seconds, for example) on the basis of the above described pressure detection signal S5 or recognizes that the pet robot is "tapped (praised)" when the state recognizing mechanism section detects a pressure lower than the predetermined threshold value and for a long time (longer than 2 seconds, for example), and informs a recognition result to the feeling and instinct model section 41 and the action determining mechanism section 42.

On the other hand, the state recognizing mechanism section 40 always monitors the heat detection signal S8 given from the heat sensor (FIG. 2), recognizes that "an internal temperature has risen" when the state recognizing mechanism section 40 detects heat higher than a predetermined level on the basis of the above described heat detection signal S8, and informs a recognition result to the feeling and instinct model section 41 and the action determining mechanism section 42.

(2-2) Processings by Feeling and Instinct Model Section 41

Figure 4:
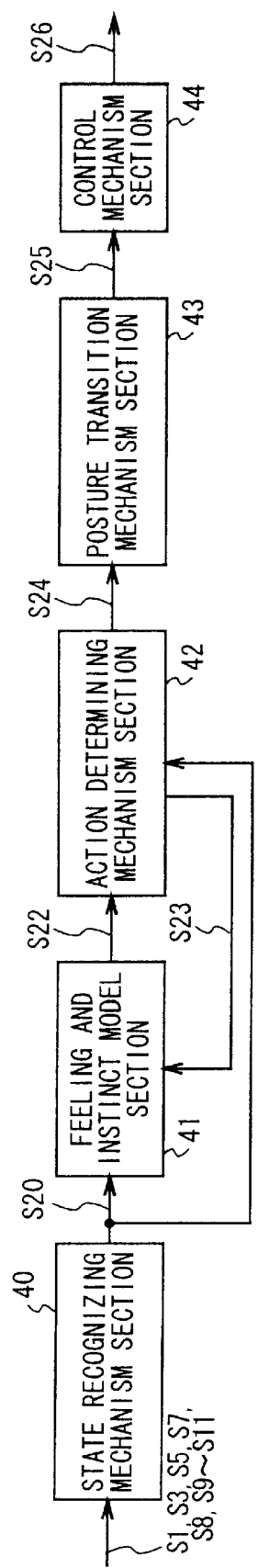
FIG. 4 is a block diagram descriptive of processings by a controller.
Figure 5:
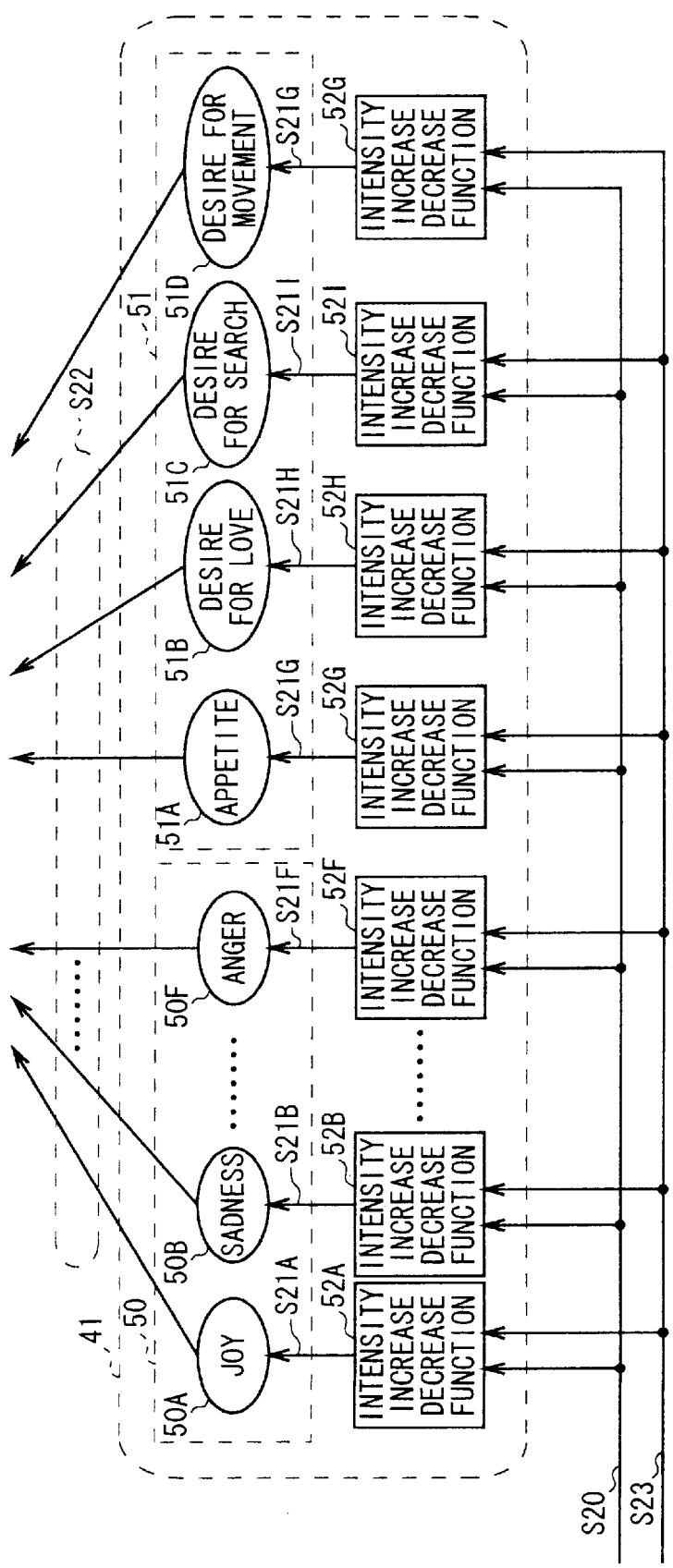
FIG. 5 is a conceptional diagram showing a feeling and instinct section.

As shown in FIG. 4, the feeling and instinct model section 51 has a basic emotion group 50 which consists of emotion units 50A to 50F disposed as feeling models corresponding to six emotions of "joy", "sadness", "surprise", "fear", "hatred" and "anger" respectively, a basic desire group 51 which consists of desire units 51A to 51D disposed as desire models corresponding to four desires of "appetite", "desire for love", "desire for search" and "desire for motion" respectively, and intensity increase/decrease functions 52A to 52J which are disposed so as to correspond to the emotion units 50A to 50F and the desire units 51A to 51D respectively.

The emotion units 50A to 50F express degrees of corresponding emotions as intensities of 0 to 100 levels, for example, and change the above described intensities from one minutes to the next on the basis of intensity information S21A to 21F given from the corresponding intensity increase/decrease functions 52A to 52F.

Furthermore, the desire units 51A to 51D express degrees of corresponding desires as intensities of 0 to 100 levels, like the emotion units 50A to 50D, and change the above described intensities from one minute to the next on the basis of intensity information S11G to S11J given from the corresponding intensity increase/decrease functions 52G to 52J.

The feeling and instinct model 51 determines a feeling state by combining the intensities of these emotion units 50A to 50F, determines an instinct state by combining the intensities of these desire units 51A to 51D, and outputs determined feeling state and instinct state to the action determining mechanism section 42 as feeling and instinct state information S22.

The intensity increase/decrease functions 52A to 52J are such functions as to generate and output intensity information S21A to S21J for increasing/decreasing the intensities of the emotion units 50A to 50F and the desire units 51A to 51D as described above in accordance with preliminarily set parameters on the basis of the state recognition information S20 given from the state recognizing mechanism section 40 and action information S23 expressing a current action or a past action of the pet robot 1 given from the action determining mechanism section 42 described later.

Accordingly, the pet robot 1 is configured to be capable of having an "irritable" or "gentle" character by setting parameters of these intensity increase/decrease functions 52A to 52J at values which are different from one another for respective action and motion models.

(2-3) Processings by Action Determining Mechanism Section 42

The action determining mechanism section 42 has a plurality of action models in the internal memory 14A. On the basis of the state recognition information S10 given from the state recognizing mechanism section 40, the intensities of the emotion units 50A to 50F and the desire units 51A to 51D of the feeling and instinct units 41 and a corresponding action model, the action determining mechanism section 42 determines a next action or motion and outputs a determination result to the posture transition mechanism section 43 as an action determining information S24.

Figure 6:
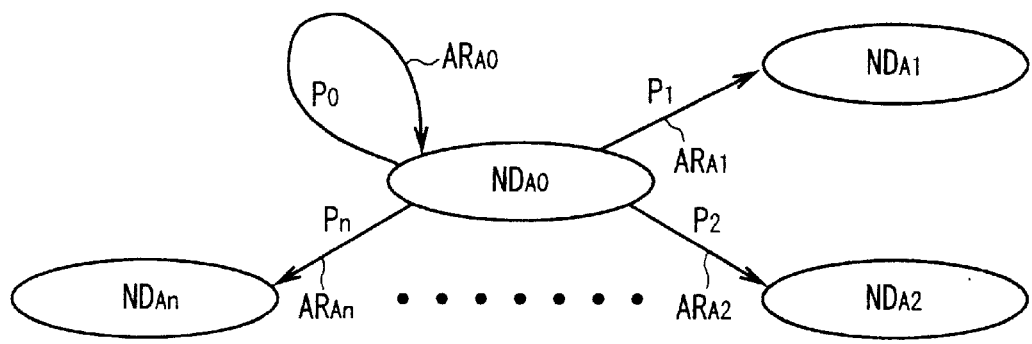
FIG. 6 is a conceptional diagram showing probability automan.

In this case, the action determining mechanism section 42 uses, as a technique to determine the next action or motion, an algorithm called probability automan which determines an identical or another node out of nodes $ND_{A0}$ to $ND_{An}$ to which transition is to be made from a node (state) $ND_{A0}$ on the basis of transition probabilities $P_0$ to $P_n$ set for arcs $AR_{A0}$ to $AR_{An}$ connecting nodes $ND_{A0}$ to $ND_{An}$ as shown in FIG. 6.

More specifically, the external memory 14B accommodates a state transition table 60 such as that shown in FIG. 7 for each of the nodes $ND_{A0}$ to $ND_{An}$ as an action model so that the action determining mechanism section 42 determines the next action or motion on the basis of the state transition table 60.

In the state transition table 60, input events (recognition results) which are to be used in the nodes $ND_{A0}$ to $ND_{An}$ as transition requirements are listed on a line of "input event" in a priority order, and further requirements for the transition requirements are described in corresponding rows on lines of "data name" and "data range".

When a recognition result of "a ball is detected (BALL)" is given in a node $ND_{100}$ defined by the state transition table 60 shown in FIG. 7, a requirement for transition to another node is therefore "a size (SIZE)" of the ball given together with the above described recognition result which is "within a range from 0 to 1000 (0, 1000)" or when a recognition result of "an obstacle is detected (OBSTACLE)" is given, a requirement for transition to another node is "distance (DISTANCE)" to the obstacle given together with the above described recognition result which is "within a range from 0 to 100 (0, 100)".

In this node $ND_{100}$, transition can be made to another node even with no input of a recognition result when an intensity of any one of the "JOY", "SURPRISE" or "SADNESS" emotion units 50A to 50F is "within a range from 50 to 100 (50, 100)" out of intensities of the emotion unit 50A to 50F and the desire units 51A to 51D of the feeling and instinct model section 41 to which the action determinating mechanism section 42 cyclically refers.

In the state transition table 60, a row of "Transition destination nodes" in a column of "probability of transition to another node" lists names of nodes to which transition is possible from each of nodes $ND_{A0}$ to $ND_{An}$ and a line of "output action" in the column of "probability of transition to another node" lists probabilities of transition to other nodes $ND_{A0}$ to $ND_{An}$ which is possible when all the requirements described on each of lines of "input even name", "data value" and "data range" are satisfied. A total sum of the probabilities of transition on the lines in each column of "probability of transition to another node" is 100%.

When a recognition result of "a ball is detected (BALL)" is given together with "size (SIZE)" of the ball "within a range of 0 to 1000 (0, 1000)", for example, in the node $NODE_{100}$ taken as this example, transition can therefore be made to "node $NODE_{120}$ (node 120)" with a probability of "30[%]" and an action or motion of "ACTION 1" is output upon execution of the transition.

Each action model is configured so that the nodes $ND_{A0}$ to $ND_{An}$ described as the state transition table 60 is connected in a plurality.

When the state recognition information S20 is given from the state recognizing mechanism section 40 or when a definite time has elapsed after finally manifesting an action, the action determining mechanism section 42 determines a next action or motion (action or motion described on the line of "output action") with a probability by utilizing the state transition table 60 of corresponding nodes $ND_{A0}$ to $ND_{An}$ out of corresponding action models accommodated in the external memory 14B and outputs a determination result to the posture transition mechanism section 43 as an action command information S24.

(2-4) Processings by Posture Transition Mechanism Section 43

When the action determination information S24 is given from the action determining mechanism section 42, the posture transition mechanism section 43 sets up a series of motion plans for taking actions and motions on the basis of the above described action determination information S24 and outputs motion command information S25 to the control mechanism section 44 on the basis of the above described motion plans.

Figure 8:
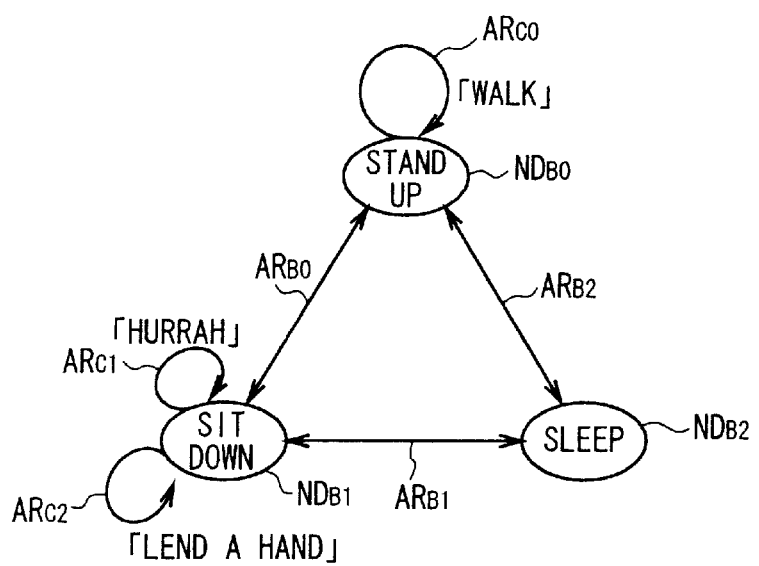
FIG. 8 is a conceptional diagram descriptive of a directed graph.

In this case, the posture transition mechanism section 43 uses, as a technique to set up the motion plans, a directed graph which expresses postures which can be taken by the pet robot 1 as nodes $ND_{B0}$ to $ND_{B2}$, mutually connects the nodes $NS_{B0}$ to $ND_{B2}$ among which transition is possible with directed arcs $AR_{B0}$ to $AR_{B2}$ expressing motions and expresses motions which complete independently in the nodes $ND_{B0}$ to $ND_{B2}$ as self motion arcs $AR_{C0}$ to $AR_{C2}$ as shown in FIG. 8.

For this purpose, the external memory 14B accommodates, as an origin of the directed graph, data of files (hereinafter referred to as network definition files) configured as data bases of start postures and end postures of all actions which the pet robot 1 can manifest and the posture transition mechanism section 43 generates directed graphs 70 to 73 for a whole body, a head member, leg members and a tail member as shown in FIG. 9 to FIG. 12 respectively on the basis the network definition files.

As apparent from FIGS. 9 to 12, postures of the pet robot 1 are roughly classified into four postures of "oStanding", "oSitting", "oSeleeping" and "oStation" which is a posture on a charging table (not shown) for charging the battery 11 (FIG. 2). Each of these postures has a base posture (T mark) which is common to all growing stages, and a singularity or plurality of normal postures (; mark) for "babyhood", "boyhood", "youth" and "adulthood".

Figure 9:
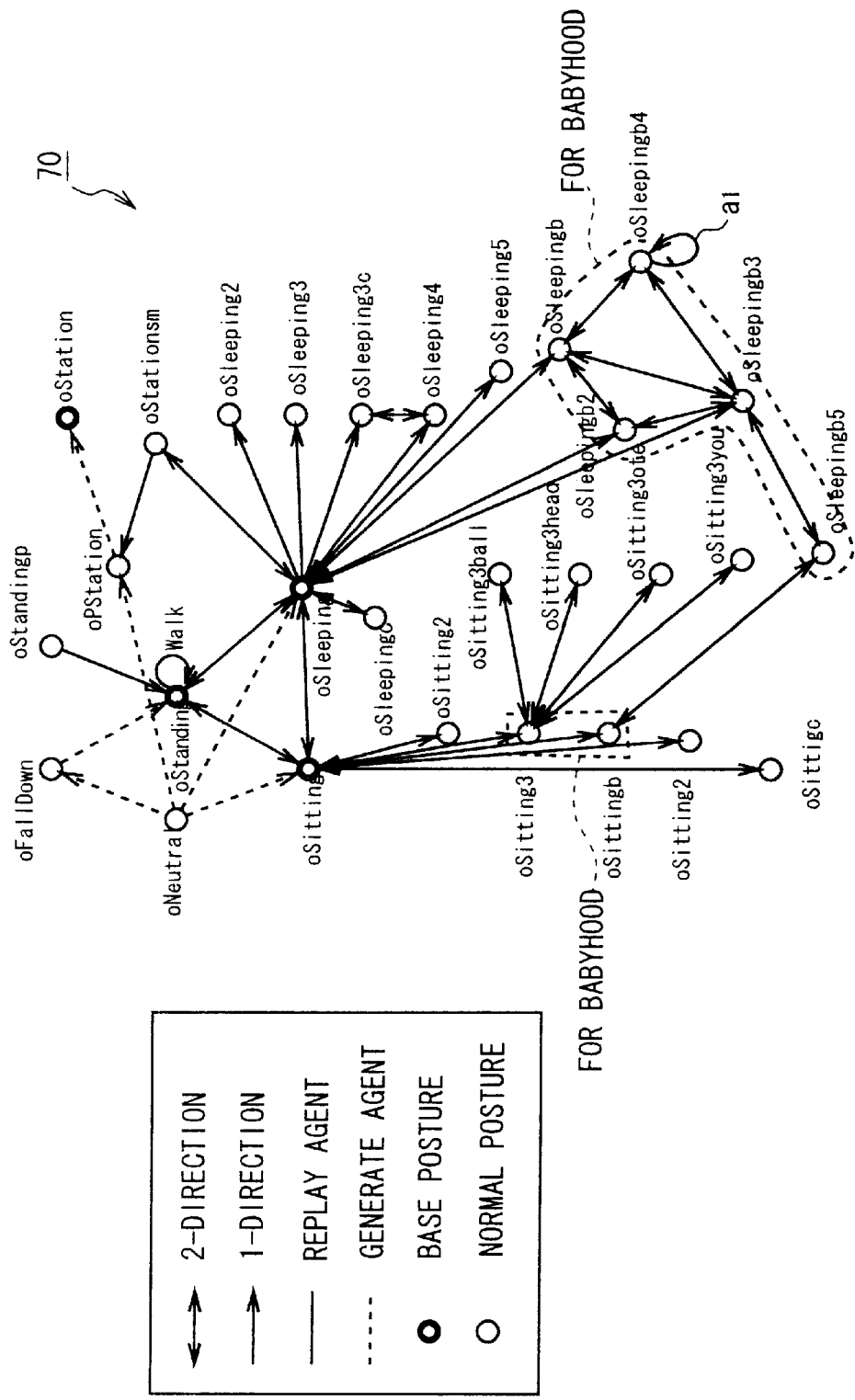
FIG. 9 is a conceptional diagram showing a directed graph for a whole body.
Figure 10:
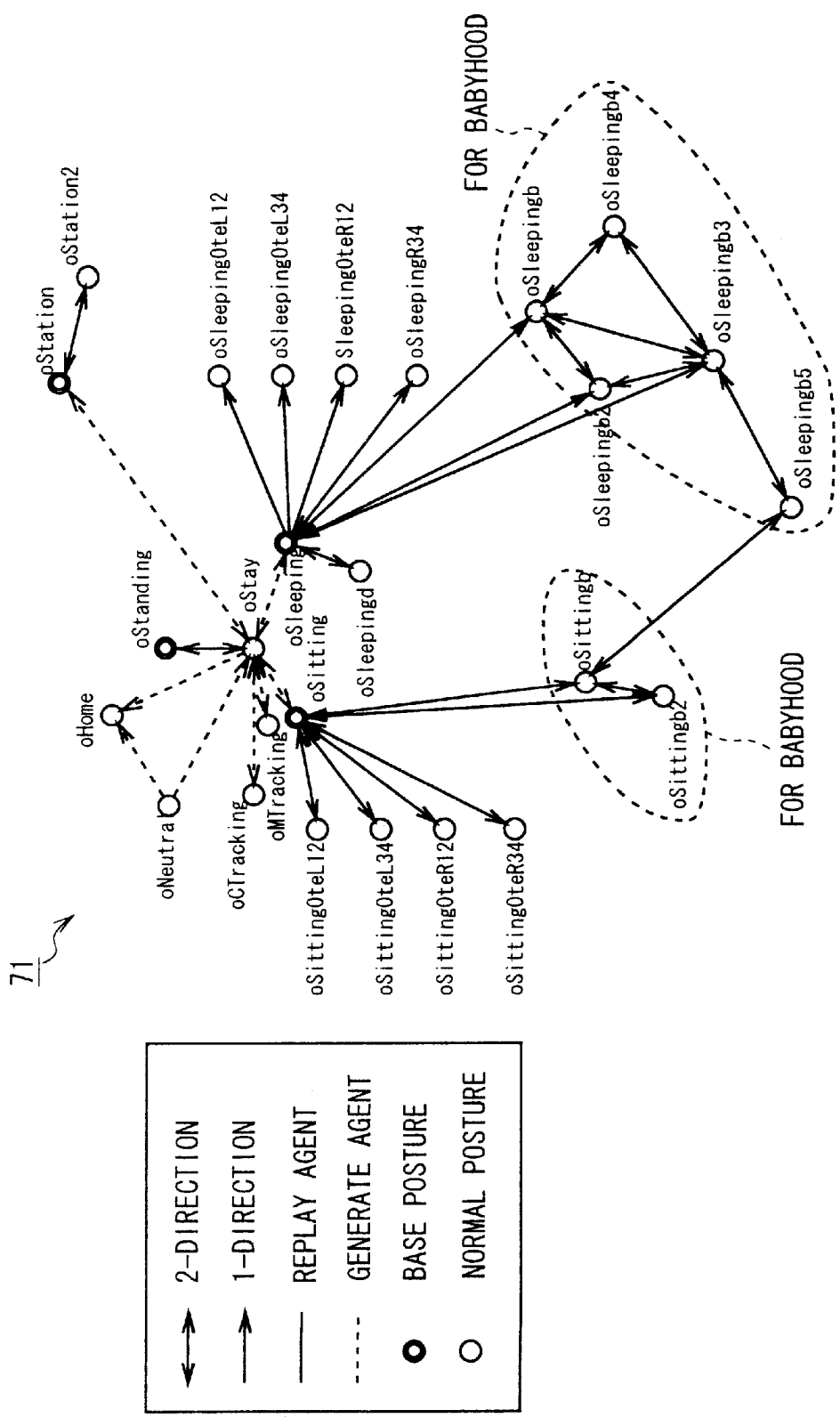
FIG. 10 is a conceptional diagram showing a directed graph for a head member.
Figure 11:
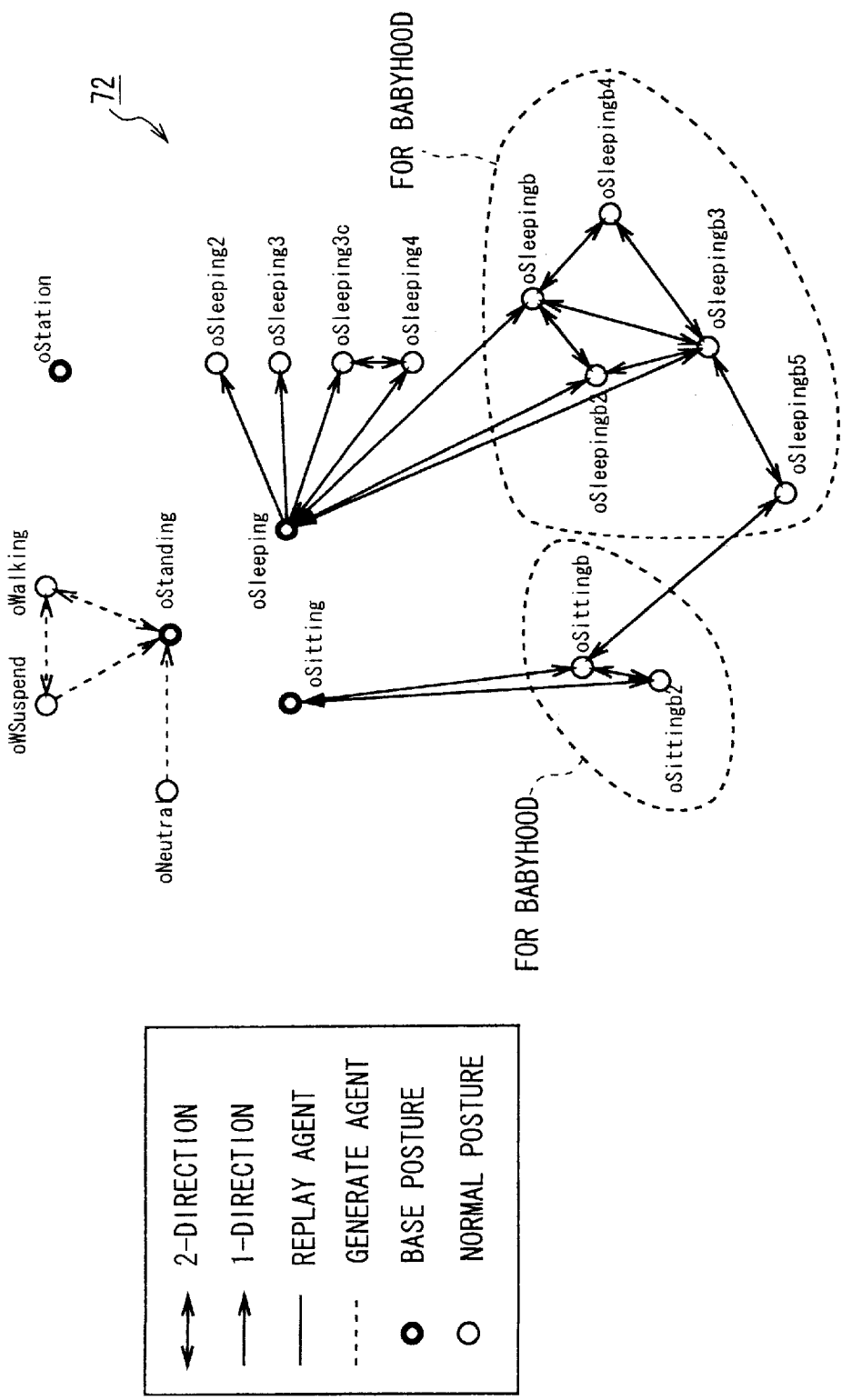
FIG. 11 is a conceptional diagram showing a directed graph for a leg member.
Figure 12:
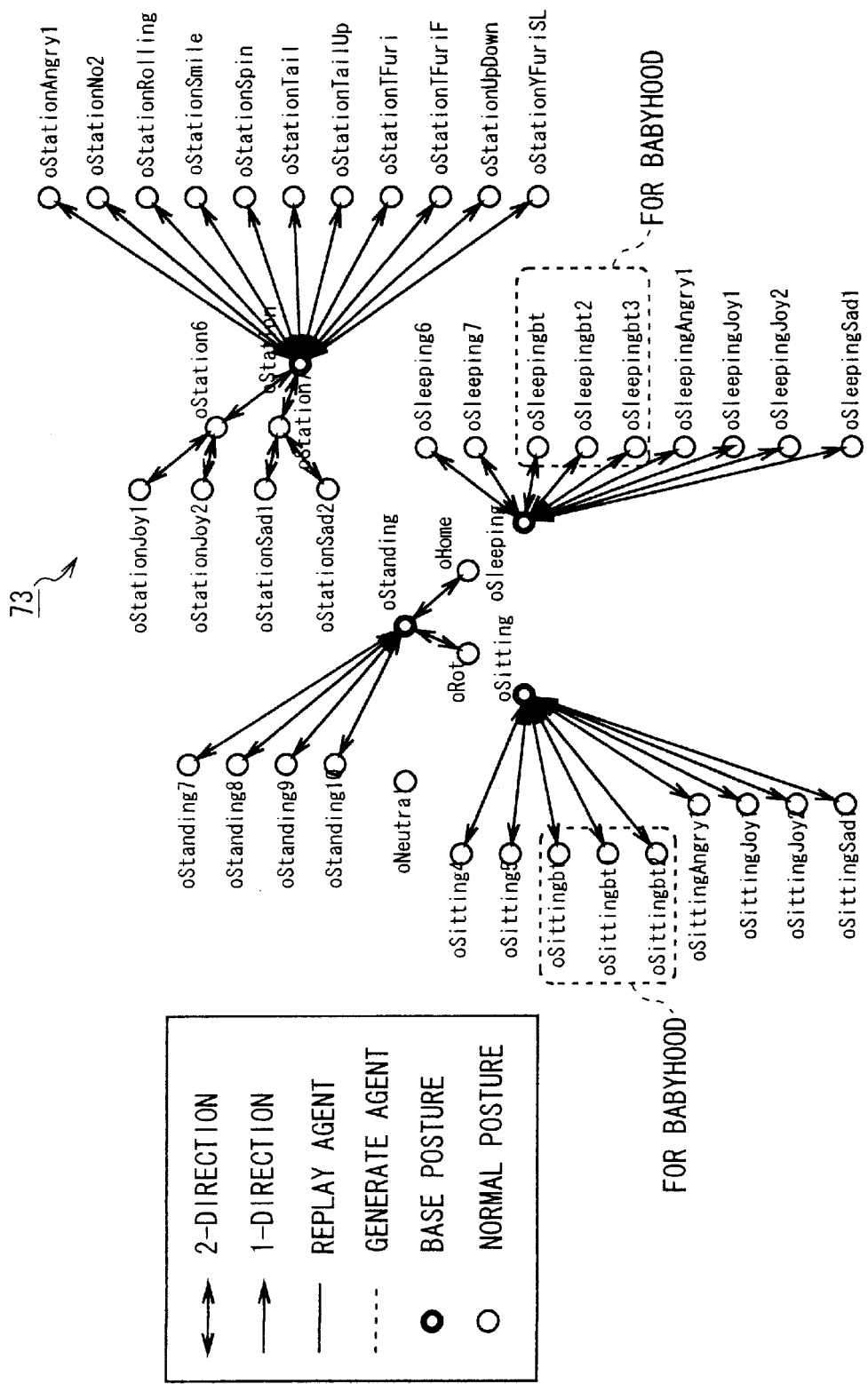
FIG. 12 is a conceptional diagram showing a directed graph for a tail member.

As apparent from FIG. 9 out of FIGS. 9 to 12 which show the normal postures for "babyhood" within enclosures of dashed lines, for example, "oSleeping b(baby)" and "oSleeping b2" to "oSleeping B5" are prepared as normal "Sleeping" postures for "babyhood", and "oSitting b" and "oSitting b2" are prepared as normal "Sitting" postures.

When an action command such as "stand up", "walk", "lend a hand" "swing the head" or "move the tail" is given from the action determining mechanism section 42 as the action command information S24, the posture transition mechanism section 43 searches for a path from a current node to a node corresponding to a designated posture, a directed arc corresponding to a designated motion or a self motion arc while following directions of the directed arcs using a corresponding directed graph 70 to 73 and successively outputs motion commands as motion command information S25 to allow the pet robot 1 to consecutively take motions corresponding to directed arcs existing in the searched path to the control mechanism section 44.

When the pet robot 1 has a current node of "oSitting b" in a directed graph 70 for a whole body and an action command for a motion which is to manifest in a node of "oSleeping b4" (a motion corresponding to self motion arc $a_1$) is given from the action determining mechanism section 42 to the posture transition mechanism section 43, for example, the posture transition mechanism section 43 searches for a path from a node of "oSitting" to a node of "oSleeping b4" on the directed graph 70 for the whole body, successively outputs a motion command for posture transition from the node of "oSitting b" to a node of "oSleeping b5", a motion command for posture transition from the node of "oSleeping b5" to a node of "oSleeping b3" and a motion command for posture transition from the node of "oSleeping b3" to the node of "oSleeping b4" to the control mechanism section 44 as motion command information S25, and finally, sequentially outputs a motion command for returning from the node of "oSleeping b4" to the node of "oSleeping b4" by way of the self motion arc $a_1$ corresponding to the designated motion to the control mechanism section 44 as the motion command information S25.

Two nodes between which transition is possible may be connected with a plurality of directed arcs to obtain different motions (a rough motion, a gentle motion or the like) dependently on "growing stages" and "characters" of the pet robot 1 and in such a case, the posture transition mechanism section 43 selects directed arcs as a path corresponding to a "growing stage" and a "character" of the pet robot 1 at that time.

Similarly, a plurality of self motion arcs for returning from a node to the above described node may be disposed to obtain different motions dependently on the "growing stages" and the "characters", and also in such a case, the posture transition mechanism section 43 selects directed arcs as a path corresponding to a "growing stage" and a "character" of the pet robot 1 as described above.

Since the above described posture transition allow substantially no pause in an intermediate posture, a node which is to be used at another "growing stage" may be passed in the course of the above described posture transition. The posture transition mechanism section 43 therefore searches for a shortest path regardless of a current "growing stage" at step of searching for a path from a current node to a node, a directed arc or a self motion arc which is a target.

When an action command is given to the head member, the leg members or the tail member, the posture transition mechanism section 43 returns a posture of the pet robot 1 to any of the base postures (T mark) corresponding to the above described action command on the basis of the directed graph 70 for the whole body and then outputs the motion command information S25 for transition of a posture of the head member, the leg members or the tail member using one of directed graphs 71 to 73 for the head member, the leg members and the tail member.

(2-5) Processings by Control Mechanism Section 44

On the basis of the motion command information S25 given from the posture transition mechanism section 43, the control mechanism section 44 generates a control signal S26 and drivingly controls the actuators (not shown) on the basis of the above described control signal S26, thereby allowing the pet robot 1 to take designated actions and motions.

(3) Configuration of Pet Robot Diagnosis System 80 according to Embodiment (3-1) Configuration of Pet Robot Diagnosis System 80

Figure 13:
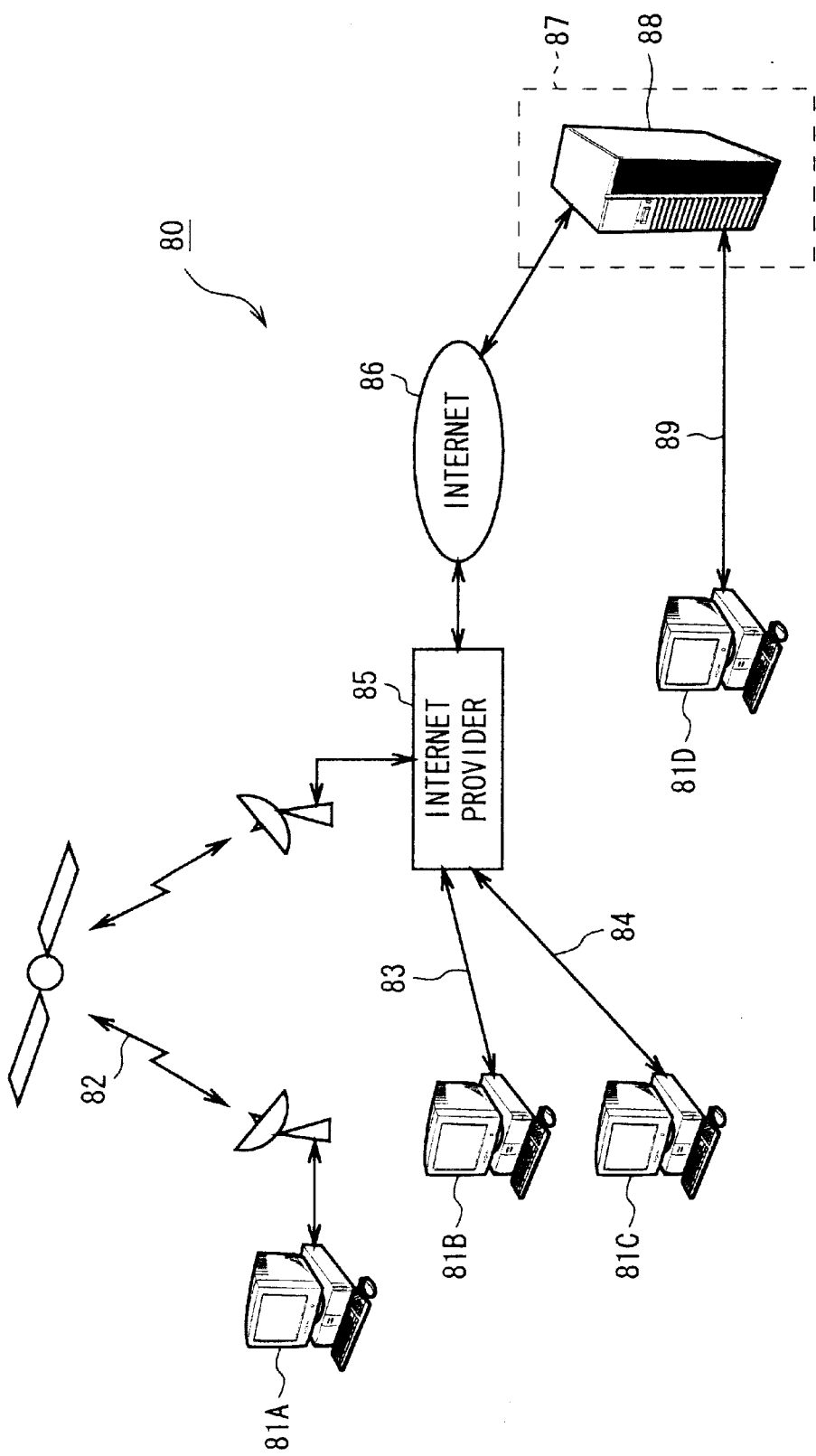
FIG. 13 is a schematic diagram showing a pet robot diagnosis system.

FIG. 13 shows a network system 80 which is configured to be capable of performing diagnoses of "characters" and "troubles" of the pet robot 1 as well as "counseling" for breeding the pet robot 1 (hereinafter referred to as a pet robot diagnosis system).

Such a robot diagnosis system 80 is configured by connecting personal terminals 81A to 81C to an internet provider 85 through a satellite communication network 82, a cable television network 83, a telephone network 84 or the like, connecting the above described internet provider 85 via an internet 86 to a server 88 installed by a diagnostician 87 of the pet robot 1 and connecting a personal terminal 81D directly to the above described server 88 through a general pubic circuit 89.

In this case, the personal terminals 81A to 81D are usual personal computers installed in general households which are configured to be capable of transmitting and receiving required data by communication with the server 88 through the internet 86 or the general public circuit 89, and reading out required data by communication with the controller 10 of the pet robot 1 through a connector (not shown) disposed in the body member unit 2 of the pet robot 1.

Furthermore, the server 88 is a web server which performs various kinds of processings for diagnosing the "character" and the "troubles" of the pet robot 1 as well as the "counseling" by the diagnostician 87 and is configured to be capable of sending out screen data for various kinds of screens described later to the personal terminals 81A to 81D which make access by way of the internet 86 or the general public circuit 89 and generating required image data for displaying images on corresponding screens on the basis of the above described image data.

Figure 14:
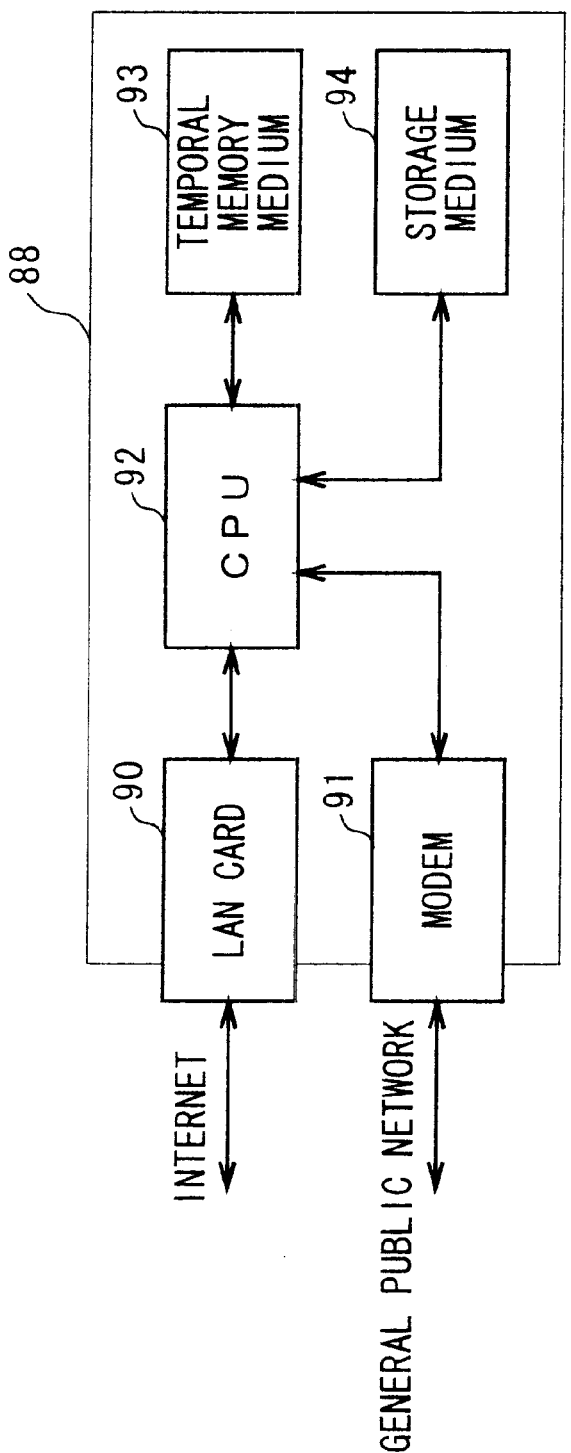
FIG. 14 is a block diagram showing a configuration of a server.

A configuration of the server 88 is shown in FIG. 14. As apparent from FIG. 14, the server 88 is configured by a local area network (LAN) card 90, a modem 91 serving as an interface circuit for the general public circuit, a CPU which controls the server 88 as a whole, a temporally storing medium 93 comprising a semiconductor memory or the like serving as a work memory of a CPU 92 and a storage medium 94 in which various kinds of data for the server 88 to perform processings described later is stored or to be stored.

The server 88 takes data or commands supplied from the personal terminals 81A to 81D which make access by way of the internet 86 or the general public circuit 89 into the CPU 92 by way of the LAN card 90 or the modem 91 and executes predetermined processings on the basis of the data or commands and control information stored in the storage medium 94.

On the basis of processing results, the CPU 92 generates screen data for various kinds of screens, for example, those which are described later and sends out the data to corresponding personal terminals 81A to 81D by way of the LAN card 90 or the modem 91.

(3-2) Trouble Diagnoses by Pet Robot Diagnosis System 80

Description will be made of trouble diagnosis by the pet robot diagnosis system 80. Prior to the description of the trouble diagnosis, description will be made of a servo system 100 of the pet robot 1.

Figure 15:
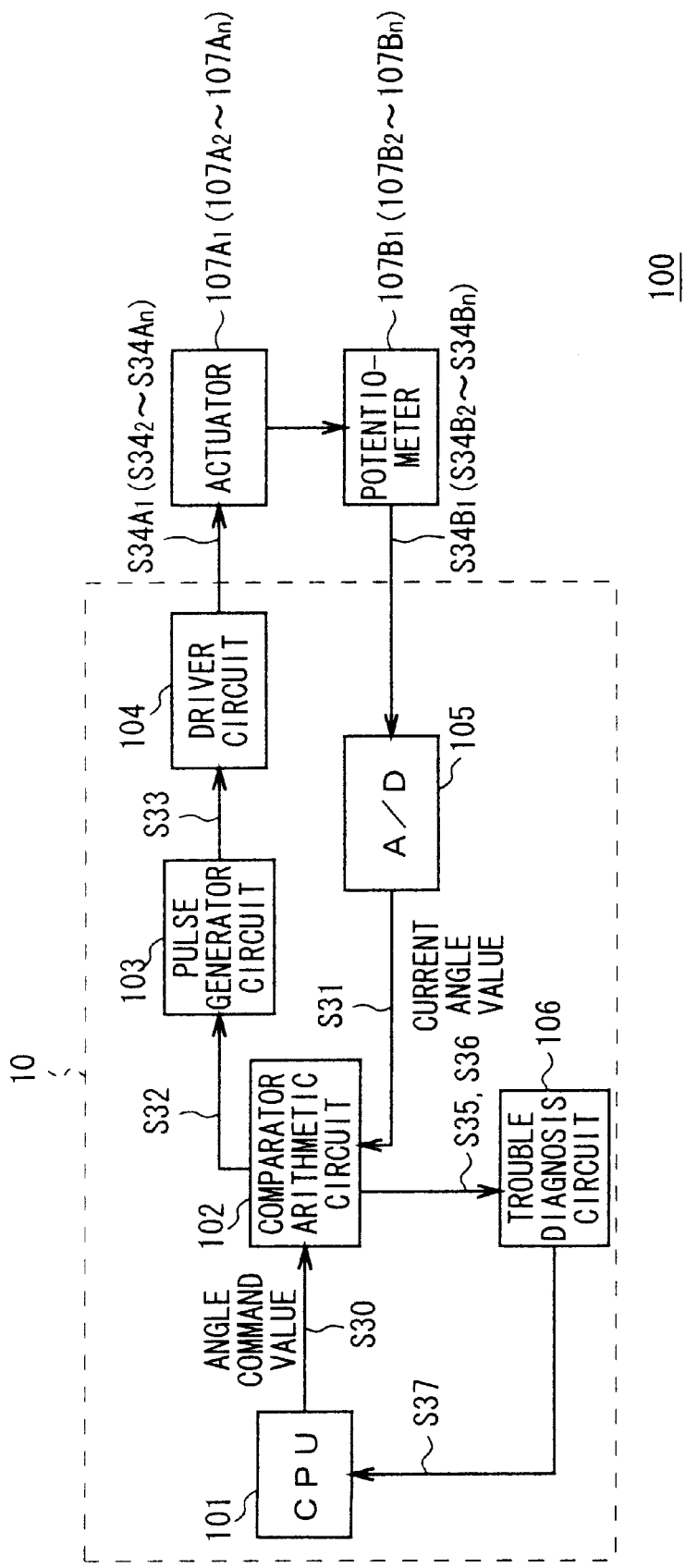
FIG. 15 is a block diagram showing a configuration of a servo system of a pet robot.

As the action determining mechanism section 42 which has been described above with reference to FIG. 4, disposed in the controller 10 of the pet robot 1 are a CPU 101, a comparator arithmetic circuit 102, a pulse generator circuit 103, a driver circuit 104 and an analog/digital converter circuit 105 as shown in FIG. 15 for driving control of the actuators $107A_1$ to $107A_n$.

At a stage to drive the actuators $107A_1$ to $107A_n$, the CPU 101 sends out rotating angles (angle command values) which are targets for output shafts of the actuators to the comparator arithmetic circuit 102 as angle command value signals S30.

Furthermore, current angle values of the actuators $107A_1$ to $107A_n$ which are detected by corresponding potentiometers $107B_1$ to $107B_n$ are converted into digital signals by the analog/digital circuit 105 and given to the comparator arithmetic circuit 102 as current angle value signals S31.

The comparator arithmetic circuit 102 calculates angle differences between the angle command values obtained on the basis of the angle command value signals S30 and current angle values obtained on the basis of the current angle value command signals S31, and sends out a calculation result to the pulse generator circuit 103 as difference signals S32.

On the basis of the difference signals S32, the pulse generator circuit 103 generates driving pulses for rotating control of the output shafts of the actuators $107A_1$ to $107A_n$ and sends out these pulses to the driver circuit 104 as driving pulse signals S33.

The driver circuit 104 generates driving signals $S34A_1$ to $S34A_n$ having a voltage value corresponding to the driving pulse signals S33 which are supplied and sends out these driving signals to the actuators $107A_1$ to $107A_n$, thereby driving the actuators $107A_1$ to $107A_n$.

At this time, rotating angles of the output shafts of the actuators $107A_1$ to $107A_n$ are detected by the potentiometers $107B_1$ to $107B_n$, and angle detection signals $S34B_1$ to $A34B_n$ consisting of detection results are converted into digital signals by the analog/signal converter circuit 105 and given to the comparator arithmetic circuit 102 as the above described current angle value signals S31.

And, until an output from the comparator arithmetic circuit 102 becomes "0" (that is, until the angle command values are coincident with the current angle values), the servo system 100 consecutively carries out similar processings at a predetermined period (1 μm, for example) in a closed loop formed by the comparator arithmetic circuit 102, the pulse generator circuit 103, the driver circuit 104, the actuators $107A_1$ to $107A_n$, the potentiometers $107B_1$ to $107B_n$ and the analog/digital circuit 105.

The servo system is therefore configured to be capable of controlling the rotating angles of the output shafts of the actuators $107A_1$ to $107A_n$ to the angle command values.

In addition, the servo system 100 has a trouble diagnosis circuit 106 which is configured to diagnose the above described servo system 100 itself. Given to this trouble diagnosis circuit 106 are a start signal S35 and an end signal S36 from the comparator arithmetic circuit 102 when new angle command values are given from the CPU 101 to the comparison arithmetic circuit 102 as the angle command value signals and when the current angle values of the actuators $107A_1$ to $107A_n$ are coincident with the angle command values.

The above described closed loop 100 does not function correctly and the output of the comparator arithmetic circuit 102 can never be "0" when any one of the comparator arithmetic circuit 102, the pulse generator circuit 103, the driver circuit 104, the actuators $107A_1$ to $107A_n$, the potentiometers $107B_1$ to $107B_n$ and the analog/digital converter circuit 105 is defective or any wire is broken in the closed loop of the servo system 100.

When the start signal is given, the trouble diagnosis circuit 106 is configured to start counting a time, judge that the servo system 100 is not troubled when the end signal S36 is given within a predetermined time or judges that the servo system 100 is troubled when the end signal S36 is not given within the above described predetermined time, and send out a judgement result to the CPU 101 as a trouble diagnosis signal S37. Accordingly, the servo system 100 is configured to allow the CPU 101 to easily recognize whether or not the servo system 100 is troubled on the basis of the trouble diagnosis signal S37.

Figure 16:
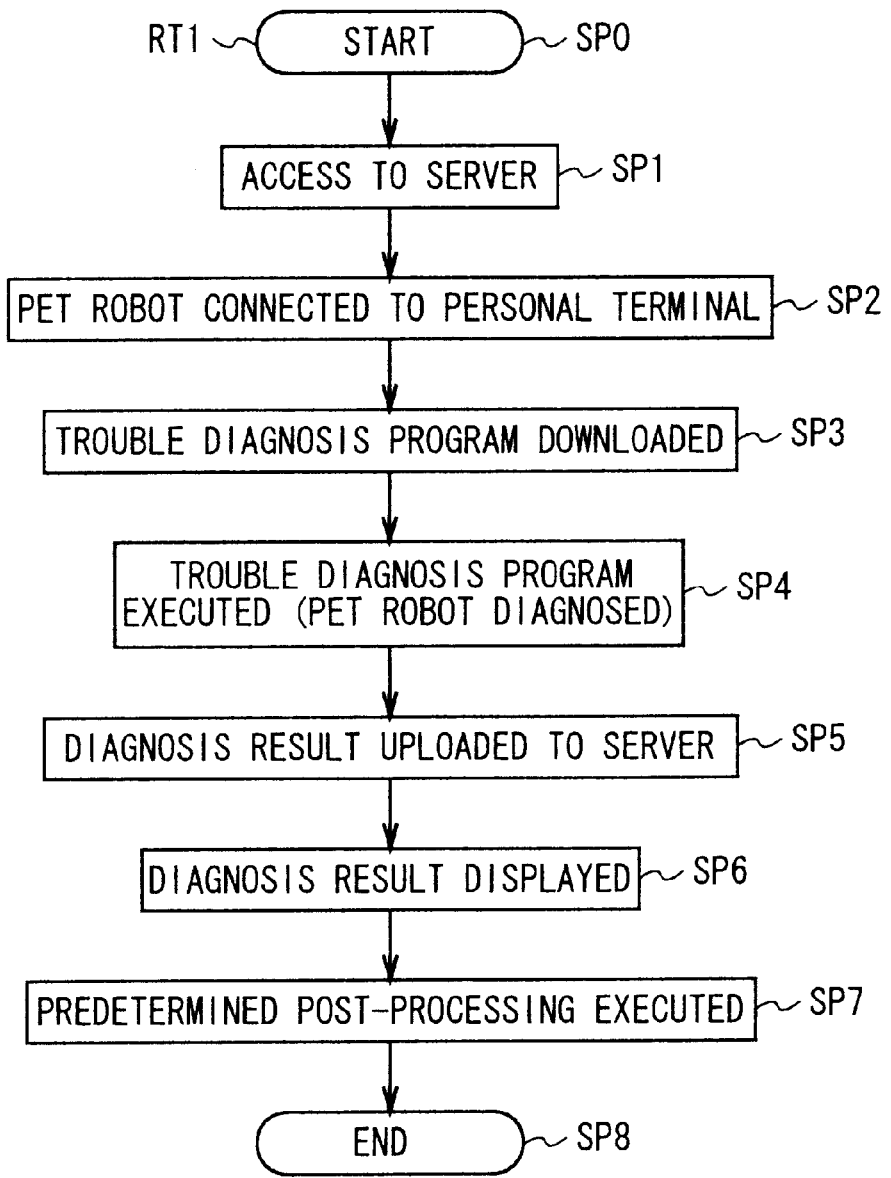
FIG. 16 is a flow chart descriptive of a trouble diagnosis sequence.

The pet robot diagnosis system 80 shown in FIG. 13 is configured to be capable of diagnosing whether or not the above described pet robot 1 is troubled in a trouble diagnosis sequence shown in FIG. 16 utilizing a self trouble detecting function of the servo system 100 of the pet robot 1.

A user who wants the pet robot 1 to be actually diagnosed by the pet robot diagnosis system 80 makes access to the server 88 using the personal terminals 81A to 81D and requests a trouble diagnosis of the pet robot 1 (step SP1).

Successively, the user connects the personal terminals 81A to 81D to the pet robot 1 (step SP2) and performs predetermined input operations, whereby a program for trouble diagnosis (hereinafter referred to as a trouble diagnosis program) is transferred from the server 88 to the personal terminals 81A to 81D and stored (downloaded) into a hard disk in the personal terminals 81A to 81D (step SP3).

When the user performs predetermined input operations, a trouble diagnosis of the pet robot 1 is carried out by the personal terminals 81A to 81D on the basis of the downloaded trouble diagnosis program (step SP4).

For such a trouble diagnosis, actually the personal terminals 81A to 81D actually drive a predetermined actuator $107A_1$ by controlling the controller 10 of the pet robot 1. At this time, a result indicating presence or absence of a trouble judged on the basis of the trouble diagnosis signal S37 output from the trouble diagnosis circuit 106 described with reference to FIG. 15 is informed from the CPU 101 in the controller 10 of the pet robot 1 to the personal terminals 81A to 81D.

On the basis of this information, the personal terminals 81A to 81D judge whether or not the servo system 100 is troubled with regard to the actuator $107A_1$. Similarly, the personal terminals 81A to 81D judge whether or not the servo system 100 is troubled with regard to all the actuators $107A_1$ to $107A_n$ by controlling the controller 10 of the pet robot 1.

Upon completing inspections of the servo system 100 whether or not it is troubled with regard to all the actuators $107A_1$ to $107A_n$, the personal terminals 81A to 81D send out inspection results to the server 88 (step SP5).

The CPU 92 of the server 88 (FIG. 14) analyzes the inspection results transferred from the personal terminals 81A to 81D and diagnoses whether or not the pet robot 1 is troubled on the basis of results of the above described analyses. When the CPU 92 diagnoses that the pet robot 1 is not troubled, the CPU 92 allows the personal terminals 81A to 81D to display results of the diagnosis (step SP6).

When the CPU 92 diagnoses that the pet robot 1 is troubled, in contrast, the CPU 91 allows corresponding personal terminals 81A to 81D to display a result (step SP6).

When predetermined input operations are carried out by the user, the CPU92 sends out data of a troubled part obtained as a result of the above described trouble diagnosis as well as data of a serial number of the pet robot 1 or the like read out of the external memory 14B (FIG. 2) of the pet robot 1 to a service center or the like, and prints out a destination display screen which lists an address and a name of a repairer (destination) of the pet robot, an address and a name of a sender (preliminarily registered by the user), a date of diagnosis, a diagnosis receipt number, a serial number of the pet robot 1, a troubled part and so on so that the user can requests repair of the pet robot 1 by sending the pet robot 1 packed in a crate bonded to which is a print of the destination display screen (step SP7).

The pet robot diagnosis system 80 is configured to allow the user to check whether or not the user's pet robot 1 needs repair, and to easily request repair of the pet robot 1 when a problem is detected (step SP 8).

(4) Abnormality Detecting Informing Function According to Embodiment

Figure 17:
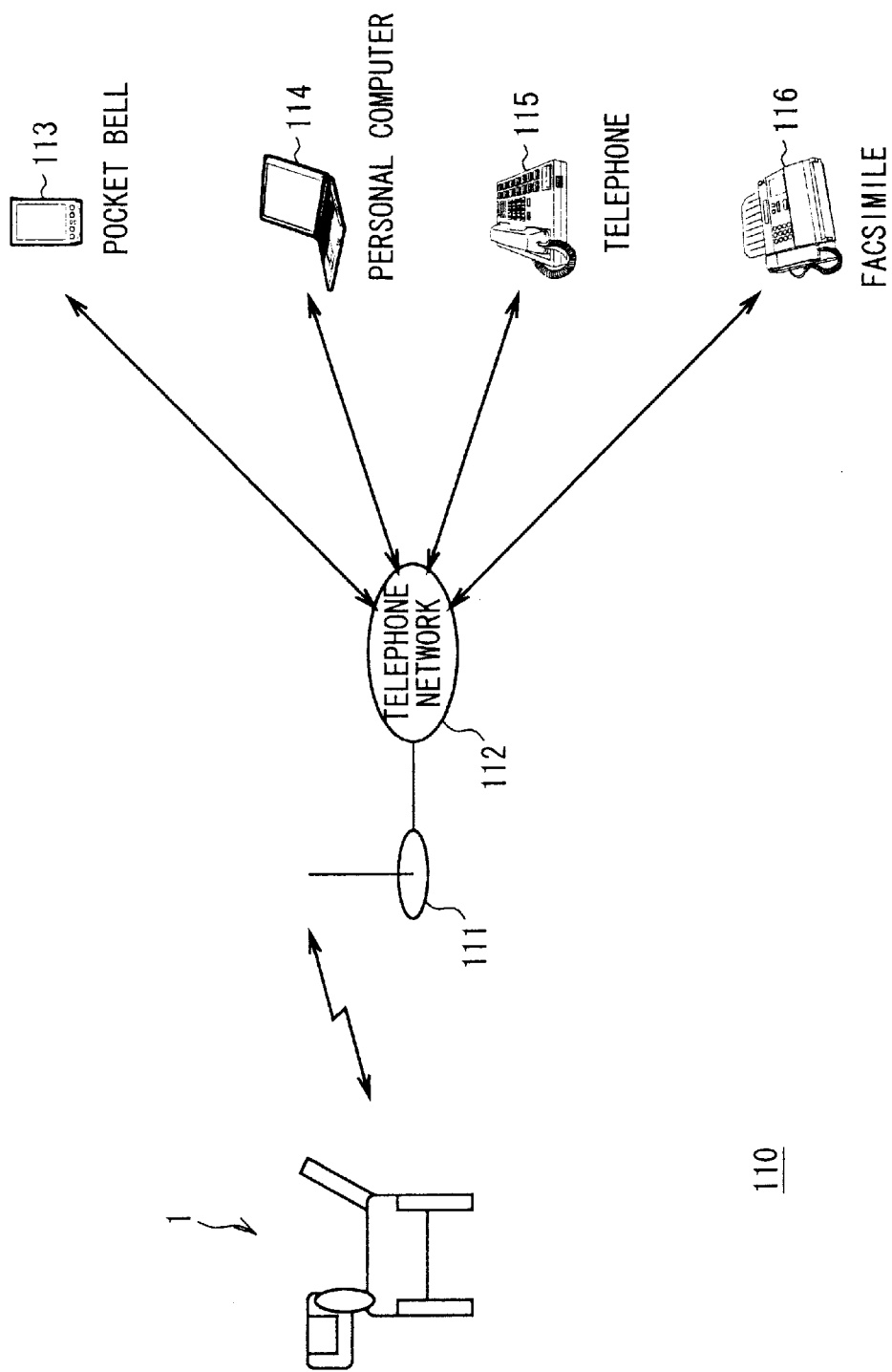
FIG. 17 is a schematic diagram showing a configuration of a network system according to the embodiment.

FIG. 17 shows a network system 110 which is configured to inform an abnormality such as a problem caused in the pet robot 1 from the pet robot 1 to various kinds of communication appliances of the user by way of the antenna 26.

In the network system 110, the pet robot 1 is capable of communicating with by way of a repeater 11 and a successive telephone network 112 with a transmission destination which is a telephone 113, a personal computer 114, facsimile 115 and pocket bell 116 of the user.

Figure 18:
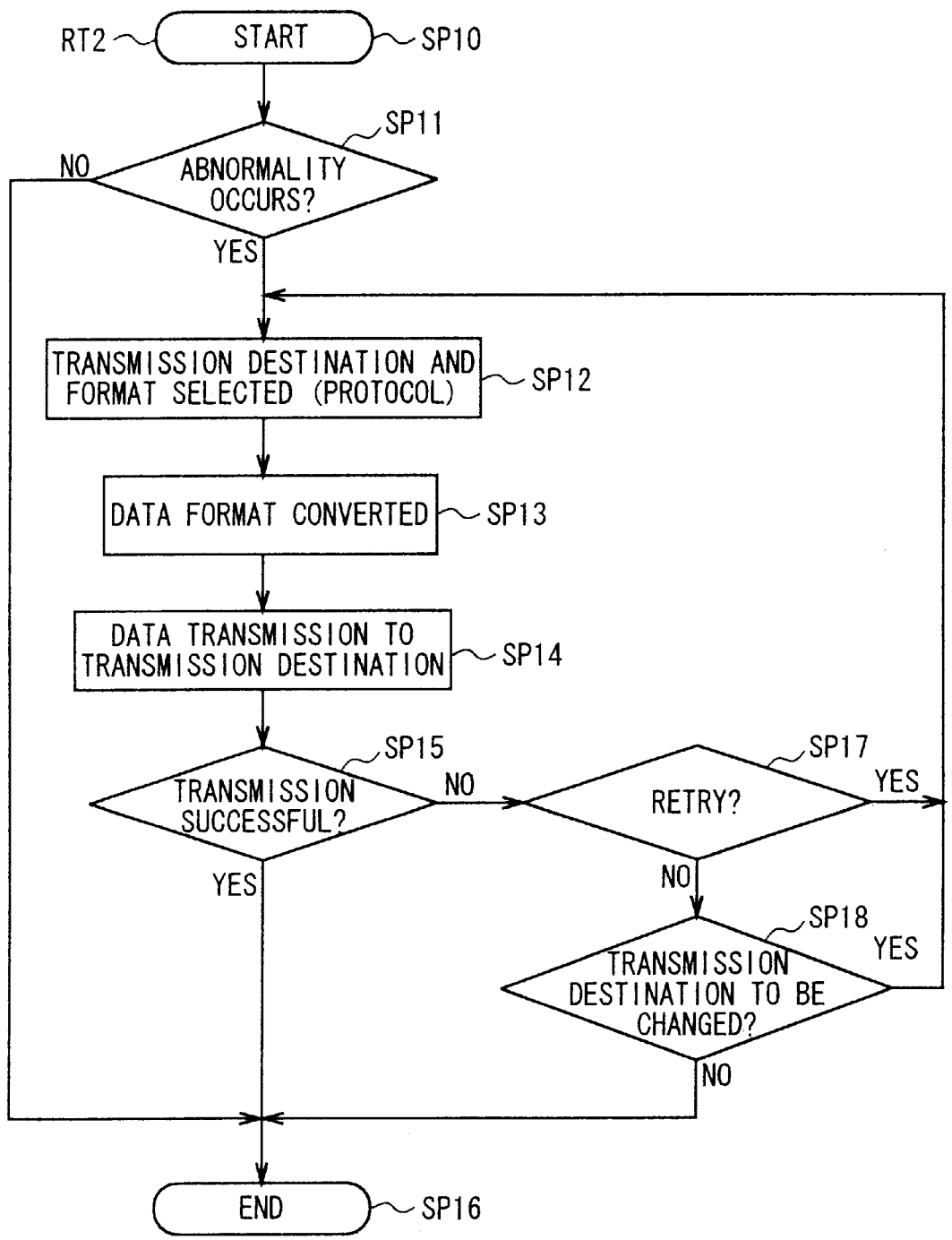
FIG. 18 is a flow chart descriptive of an abnormality detection sequence.

Now, description will be made of an abnormality detecting informing function of the pet robot 1 using the network system 110. When an abnormality such as a trouble is detected in a abnormality detecting informing sequence RT2 shown in FIG. 18, the pet robot 1 is capable of transmitting the abnormality to the various kinds of communication appliances 113 to 116 owned by the user.

When the trouble diagnosis is carried out by the pet robot diagnosis system 80, the controller 10 (FIG. 2) of the pet robot 1 first enters the above described abnormality detecting informing sequence RT2 from step SP10 and judges whether or not an abnormality occurs at successive step SP11 on the basis of a trouble diagnosis result obtained by the pet robot diagnosis system 80.

When an affirmative result is obtained at this step SP11, the controller 10 selects a communication appliance as a transmission destination out of the plural kinds of the communication appliances on the basis of a transmission destination list D1 and a protocol list D2 read out of the external memory 14B, and selects a data format corresponding to the above described communication appliance (that is, switches connection of the data converters 32A to 32D in the communication unit 21 shown in FIG. 3) and then proceeds to step SP13.

When a negative result which indicates an abnormality such as a trouble is not caused in the pet robot 1 is obtained at step SP11, on the other hand, the controller 10 proceeds directly to step SP16 to terminate the above described abnormality detecting informing sequence RT2.

At step SP13, the controller 10 converts a kind of a caused abnormality (image information and sound information) into a data format corresponding to the communication appliance selected as the transmission destination in the communication unit 21 (FIG. 3) and proceeds to step SP14 to transmit the above described image information and sound information (that is, the transmission data S17) by way of the antenna 26.

Successively, the controller 10 proceeds to step SP15 to judge whether or not the transmission is successful at the above described step SP144, and when an affirmative result which indicates a successful transmission of an abnormality detection is obtained, the controller proceeds to directly to step SP16 to terminates the above described abnormality detecting informing sequence RT2.

When a negative result which indicates an unsuccessful transmission of the abnormality detection is obtained at step SP15, in contrast, the controller 10 proceeds to step SP17 to judge whether or not transmission is to be made once again to the same communication appliance (that is, the transmission is to be retried), and only when an affirmative result is obtained, the controller 10 returns again to step SP12 to repeat processings similar to those described above.

When a negative result indicating no transmission of abnormality detection from the pet robot 1 is obtained at step SP17, on the other hand, the controller proceeds to step SP18 to judge whether or not the transmission destination is to be changed (that is, whether or not a transmission appliance different from the preceding one is to be selected), and only when an affirmative result is obtained the controller 10 returns again to step SP12 to repeat processings similar to those described above on condition that a transmission destination different from the preceding one is to be selected. In this case, it is necessary to select a data format corresponding to the communication appliance to be selected as a transmission destination.

When a negative result is obtained at step SP18, the controller 10 proceeds directly to step SP16 to terminate the above described abnormality detecting informing sequence RT2.

When the pet robot 1 is diagnosed as troubled by the above described pet robot diagnosis system 80, the pet robot 1 is capable of transmitting data indicating the effect to a selected transmission destination as described above or changing the transmission destination to another at need and performing the transmission should the data be not transmitted to the above described transmission destination.

Though the controller 10 judges whether or not the transmission is successful at a time of the notification at the above described step SP15, the user may not catch contents of the transmission data and the pet robot diagnosis system 80 can be configured to judge whether or not the transmission is successful on a standard which is described below.

First, in a case where the pet robot 1 can exchange data with the user (by means of a telephone or chat) as conversation first, the transmission is judged as successful when the user makes a specific answer. In case of conversation by means of a telephone, for example, the transmission is judged as successful when the user takes up a transceiver set but judged as a fail when the user makes no answer within a predetermined time. In case of a caretaking telephone, however, a confirmation sound (sound guide) is transmitted to the user to urge him to transmit a command such as "1#" indicating understanding of contents, "2#" indicating retransmission of the contents of the abnormality, "3#" indicating information to a next user and "4#" indicating emergency stop, and the transmission is judged as successful when the command is returned with in the specific time.

In case of the caretaking telephone, the pet robot diagnosis system 80 may be configured otherwise so that it judges that data is not transferred to the user and the transmission is a fail when the user does not call back within a specified time and judges that the transmission is successful when the user calls back within a predetermined time. Alternately, the pet robot diagnosis system 80 may be configured to judge that the transmission is successful when a message can be deposited in case of the caretaking telephone.

In case of the chat, for example, the pet robot diagnosis system 80 may be configured to issue a request for chat connection by the user and judge the transmission as successful when the diagnosis system confirms the connection by the user. Alternately, the pet robot diagnosis system 80 may be configured to issue a request for chat connection by the user, demand for response from the user and judges the transmission as successful when the diagnosis system obtains a predetermined response. When a response is not obtained within a predetermined time, on the other hand, the diagnosis system judges the transmission as a fail even though the connection is made.

Secondly, in a case where the pet robot 1 cannot exchange data with the user (facsimile, electronic mail, character mail or the like), the pet robot diagnosis system 80 judges the transmission as successful when the user makes access (calls back) within a predetermined time.

Furthermore, thirdly, in case where the pet robot 1 cannot exchange data with the user as conversation (facsimile, pocket bell, electronic mail, character mail or the like), the diagnosis system judges the transmission as successful when the user makes access (calls back) and data includes a predetermined format or a specific character row. In this case, the pet robot diagnosis system 80 has a higher reliability though the diagnosis system increases procedures to be taken by the user.

In a callback mode in the second or third case, means for notifying from the diagnosis system to the user may be different from means for calling back from the user to the diagnosis system. For, example, notification can be made to the user by a one-way type communicating means such as a facsimile or a pocket bell and the user can make access to the diagnosis system by means of a telephone upon notification for confirmation of the notification.

In case of the electronic mail, for example, the transmission is judged as successful when a communicating mate gives an answer in a predetermined format within a predetermined time after the transmission. It is conceived to use a method which uses a unique character row in each notification data as the format and judges the transmission as successful when an identical character row is returned or a method which judges the transmission as successful when a specific word (password) is written. The transmission is judged as a fail when an error is returned.

In case of the facsimile, pocket bell or character mail, the transmission is judged as a fail when the transmission is found as not successful after the transmission is made. The transmission is judged as successful when the user connects a telephone, electronic mail or the like within a predetermined time.

(5) State Replying Function According to Embodiment

Now, description will be made of a state replying function of the pet robot 1 using the above described network system 110 (FIG. 17). The pet robot 1 is capable of notifying a surrounding condition and an internal state to the various kinds of communication appliances 113 to 116 of the user in response to spurrings by the user in a state replying sequence T3 shown in FIG. 19.

When the pet robot 1 receives a command transmitted from the various kinds of communication appliances of the user by way of the telephone network 112 and the repeater 111, the controller 10 (FIG. 2) enters the above described state replying sequence RP3 from step SP20 and judges whether or not the received command is a natural language at a successive step SP21.

When a negative result is obtained at this step SP21 which indicates that the received command is described in a programming language, the controller 10 proceeds to step S22, analyzes contents corresponding to the above described programming language in the image processor 22 or the sound processor 20 and then proceeds to step S24.

When an affirmative result is obtained at the step SP21 which indicates that the received command is described in the natural language, in contrast, the controller 10 proceeds to step S23, and analyzes contents corresponding to the above described natural language in the image processor or the sound processor.

Even if the natural language is more difficult for interpretation than the programming language in this case, the natural language is sufficiently applicable when words and a grammar of the natural language which are to be used with a high possibility within a range of actions or motions of the pet robot are preliminarily stored in the image processor 22 and the sound processor 20. Specifically, it is sufficient for analysis of contents of a command "What are you looking at ?" to decompose the contents into words of "What", "are", "you", "looking", "at" and "?"

Successively, the controller 10 proceeds to the step SP24 to allow the pet robot 1 to take an action and a motion corresponding to the contents of the command, acquires information of a surrounding environment and an internal state, then proceeds to step SP25, and returns image data or sound data obtained as a result to the communication appliance which transmitted the above described command. Specifically, the pet robot 1 returns an image pickup result obtained at a current time with the CCD camera 16 to the corresponding communication appliance (that is, command transmission source) as a reply to the command "What are you looking at ?".

Then, the controller 10 proceeds to step S26 to terminate the above described state replying RT3.

When the pet robot 1 receives a command from the user at a remote place, the pet robot 1 is capable of executing an act and a motion corresponding to contents of the above described command, and then replying a result of the above described execution to a transmission source of the command.

(6) Operation and Effect of the Embodiment

When the pet robot 1 which has the above described configuration recognizes occurrence of an abnormality such as a trouble, the pet robot 1 transmits transmission data indicating the event to a communication appliance selected as a transmission destination, whereby the user having the above described communication appliance is able to know a state of the pet robot 1 even when he is at a remote place.

Furthermore, the pet robot 1 is configured to select another communication appliance selects another communication appliance as another transmission destination as occasion demands and transmit the transmission data to this communication appliance when the transmission data does not reach a communication appliance, thereby remarkably enhancing a probability to transmit the transmission data to a user himself when the user has plural kinds of communication appliances or to any one of users when a plurality of users have communication appliances.

Furthermore, the pet robot 1 is configured to transmit the transmission data always in a format corresponding to a communication appliance selected as a transmission destination out of plural kinds of communication appliances, thereby allowing existing communication appliances to be used regardless of data formats and enhancing versatility.

When the pet robot 1 receives a command from a user at a remote place, the pet robot 1 executes an action and a motion corresponding to contents of the command and then replies a result of the above described execution to a transmission source of the command, thereby enabling communication with the user even when he is not in a short distance from the pet robot.

The above described configuration allows the pet robot 1 to communicate with a communication appliance selected as a transmission destination from among plural kinds of communication appliances as occasion demands, thereby making it possible to realize the pet robot 1 which is capable of notifying an abnormality such as a trouble occurring in the pet robot 1 itself with a remarkably high probability giving a higher intimacy and a higher feeling of satisfaction to users as well as an enhance amusement property.

(7) Other Embodiments

Though a telephone, a personal computer (for electronic mails), a facsimile and a pocket bell are used as plural kinds of communication appliances in the above described embodiment, the present invention is not limited by the embodiment and other various kinds of communication appliances are usable so far as the appliances are capable of transmitting and receiving image information and sound information. In this case, data converters 32A to 32D corresponding to communication appliances to be used are to be disposed in the above described protocol converter 30 shown in FIG. 3.

Also in a case where a plurality of users have a plurality of communication appliances of an identical kind, the pet robot 1 is capable of selecting the communication appliances and has an enhanced probability of notification as in the above described case where a user has a plural kinds of communication appliances.

Though the communication unit 21 shown in FIG. 3 is configured to acquire the transmission destination list D1 and the protocol list D2 from the external memory 14B in the above described embodiment, the present invention is not limited by the embodiment, and the transmission destination list D1 and the protocol list D2 can be downloaded into the communication unit 21 by way of a communication network (not shown) or a user can directly set and input the transmission destination list D1 and the protocol list D1.

Though the pet robot 1 is configured to select another communication appliance as another transmission destination and transmit the transmission data to this transmission appliance when the transmission data does not reach the communication appliance selected as the transmission destination in the above described embodiment, the present invention is not limited by the embodiment and transmission destinations can be switched consecutively in a priority order which is preliminarily set. The priority order can be set, for example, so that notification is made to a pocket bell when a portable telephone is turned off or the notification is made to a telephone owned by a mother when a telephone owned by a father is stopped.

Though the servo system 100 (FIG. 15) of the pet robot 1 is diagnosed for a trouble (to obtain a internal state recognition result) in the above described embodiment, the present invention is not limited by the embodiment and the pet robot 1 can be configured to diagnose other hardware. Furthermore, the pet robot 1 can be configured to diagnose software such as the control program and various kinds of control data.

Though the pet robot 1 is configured to notify a trouble diagnosis result to a transmission destination and notify to another transmission destination when the above described notification fails, the present invention is not limited by the embodiment and the pet robot 1 can be configured to change an action pattern dependently on whether the above described notification is successful or fails. Specifically, the pet robot 1 can be configured to confirm security of the pet robot 1 itself, shift to a relatively secure state and wait for a command from a user or turn off a power source and entrust itself to the user when the notification is successful.

When the notification fails, on the other hand, the pet robot 1 can turn off the power source directly, notify once again after waiting for some while or search for a charger.

Figure 20A:
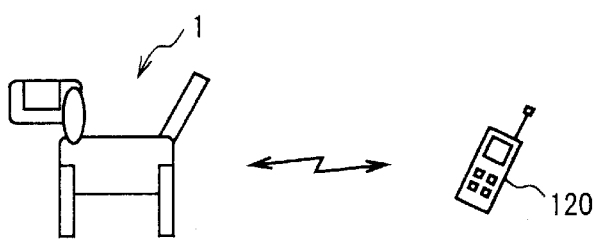
FIGS. 20A to 20C are schematic diagrams showing network configurations according to other embodiments.
Figure 20B:
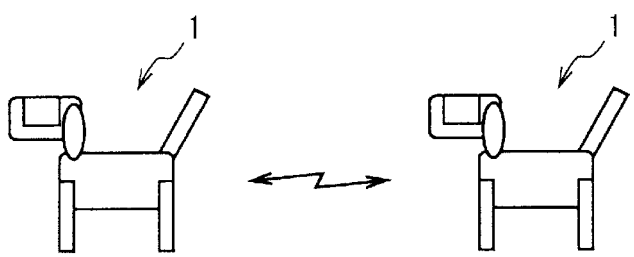
Figure 20C:
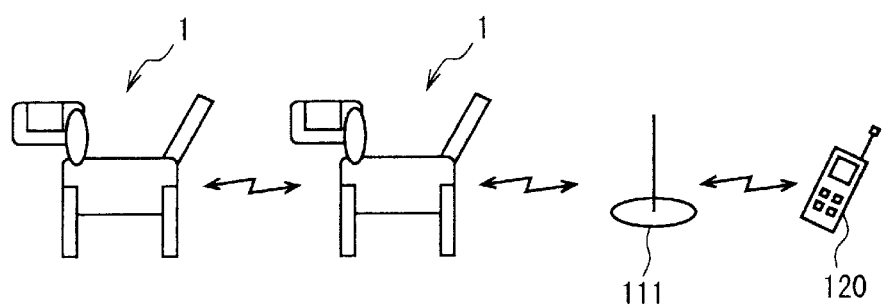
Figure 21:
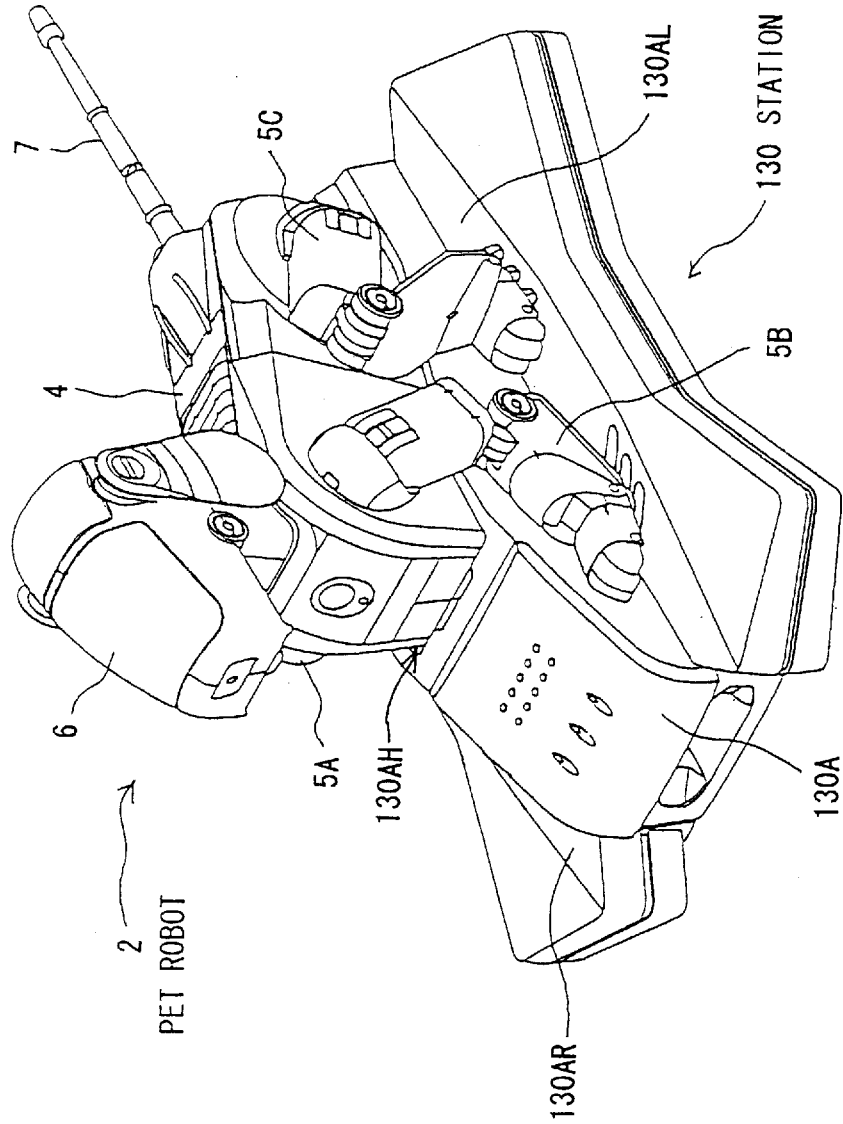
FIG. 21 is a perspective view sowing appearance configuration of a pet robot and a station according to another embodiment.

Though the communication system between the pet robot 1 and the transmission destinations is configured as the network system 110 shown in FIG. 17 in the above described embodiment, the present invention is not limited by the embodiment and a communication system can be configured as shown in FIGS. 20A to 20C. The pet robot 1 can be configured to communicate directly with a portable telephone 120 by optical communication or using infrared rays, radio waves, ultrasonic waves or the like, for example, as shown in FIG. 20A. Furthermore, the pet robots 1 can be configured to communicate directly to each other by optical communication or using infrared rays, radio waves, ultrasonic waves or the like as shown in FIG. 20B. Furthermore, the pet robot 1 can be configured to have no communicating function and communicate finally with a portable telephone by way of a pet robot 1 which has a communicating function with a repeater 111 as shown in FIG. 20C. When the repeater 111 is disposed between the pet robot 1 and the portable telephone 120, the above described repeater 111 can be used in two or more dependently on a communication distance.

Figure 19:
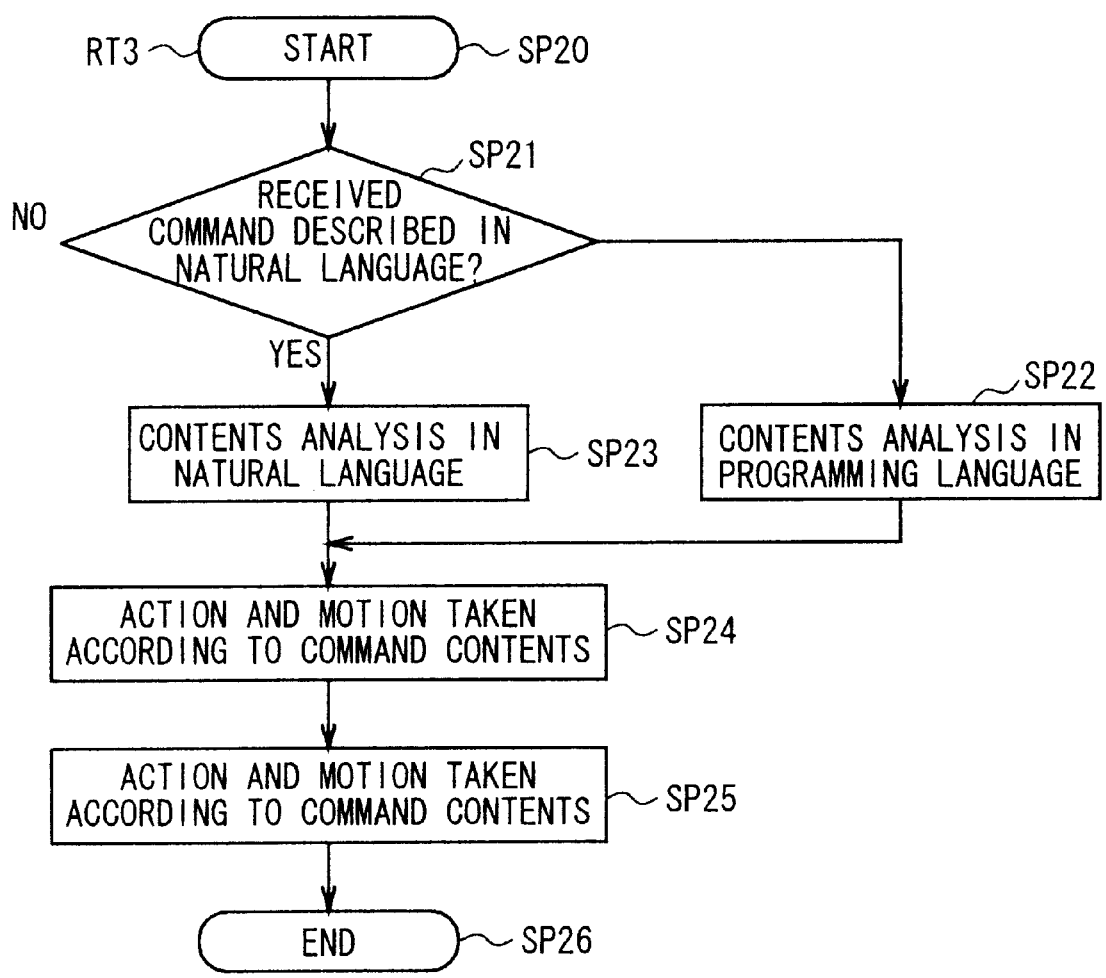
FIG. 19 is a flow chart descriptive of a state replying sequence.

Though the pet robot 1 is configured to acquire the information of the surrounding environment and/or the internal state in response to the command from the external appliance as in the state replying sequence RT3 shown in FIG. 19 in the above described embodiment, the present invention is not limited by the embodiment and the pet robot 1 can be configured to spontaneously acquire information of a surrounding environment and/or an internal state. In this case, the pet robot 1 can transmit the acquired information of the surrounding environment and/or the internal state at a random timing, at a timing when a parameter of the emotion units and the desire units of the feeling and instinct model exceeds a predetermined value or at a preset timing.

Though the selecting means for selecting the transmission destination is configured by the protocol converter 30 and the setting modifier 34 in the communication unit 21, and the transmitting means for transmitting the predetermined information to the transmission destination selected by the above described selecting means is configured by the transceiver 31 and the setting modifier 34 in the communication unit 21 in the above described embodiment, the present invention is not limited by the embodiment and the selecting means and the transmitting means can have other various kinds of configurations.

Though the information acquiring means for acquiring the information of the surrounding environment and/or the internal state is configured by the CCD camera 16, the microphone 15 and the touch sensor 17 of the head member unit 4, the battery sensor 12, the heat sensor 13, the acceleration sensor 23 and the angular velocity sensor 24 in the body member unit 2, and the force sensors 25A to 25D in the leg member units 3A to 3D in the above described embodiment, information acquiring means having other various kinds of configurations can be used so far as the information acquiring means allows the pet robot 1 to acquire information of a surrounding environment and/or an internal state. In this case, the transmitting means for transmitting information acquired by the information acquiring means can be configured so as to be widely applicable to units other than the communication unit 21.

Though the pet robot 1 is configured as shown in the block diagram presented as FIG. 2 in the above described embodiment, the present invention is not limited by the embodiment and the above described communication unit 21 in the body member unit 2 can be disposed in a battery charging device (hereinafter referred to as a station) 130 exclusively for the pet robot 1. This station makes it possible to simplify a configuration of a pet robot, thereby providing a result to lessen a weight and increase functions of the pet robot using substitutional parts.

The station 130 has a wire which is pulled out of a built-in charger (not shown) and connected to a domestic power source by way of an AC adaptor, a concave space 130AH which is formed in the middle of a top surface of a main body so as to correspond to the body member unit 2 of the pet robot 1, and flat surfaces 130AR and 130AL which are formed in a longitudinal direction on both sides of the above described concave space 130A. Disposed in the concave space 130AH of the station 130 is a second connector half 141 on which protruding electrode terminals are formed so as to correspond to electrodes on a first connector half 140 which is disposed on a side of the pet robot 1.

When the pet robot 1 is mounted in a predetermined posture so that the body member unit 2 is fitted into the concave space 130AH of the station 130, the first connector half 140 on a side of the body member unit 2 is brought into contact and conductive with and to the second connector half 141 on a side of the station 130.

Figure 22:
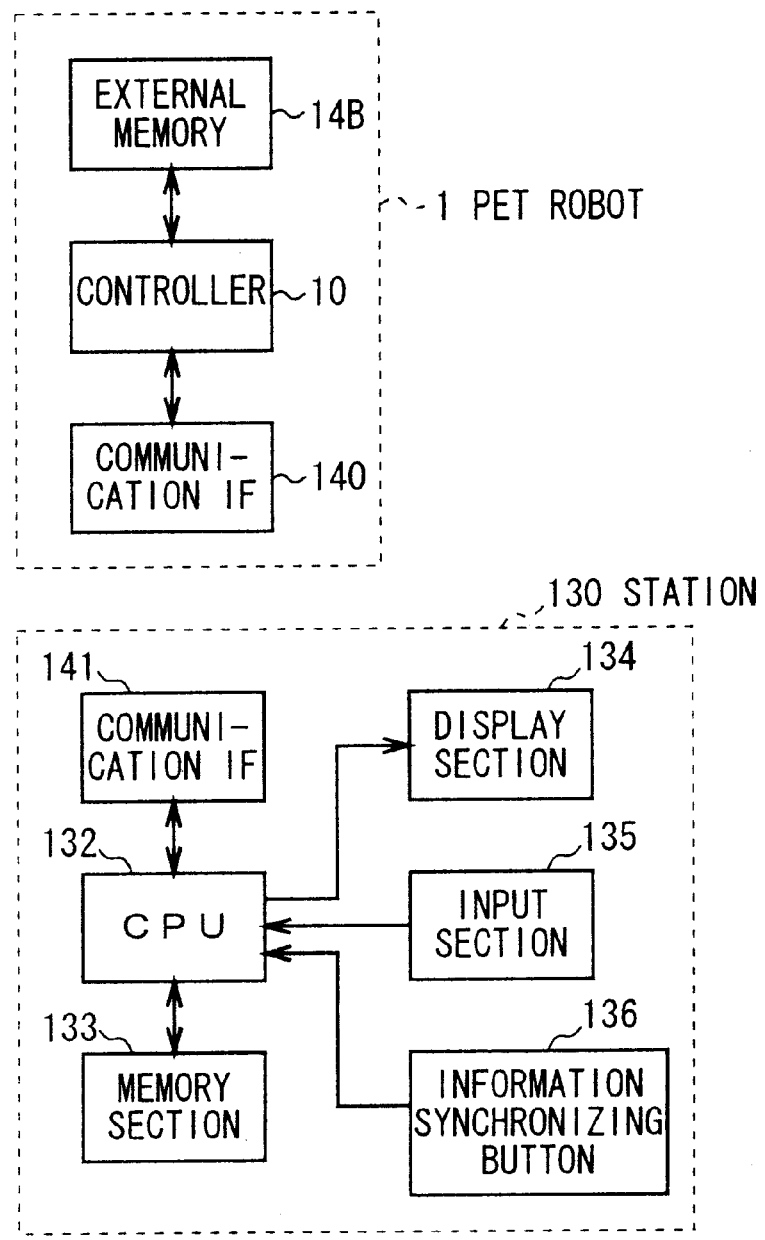
FIG. 22 is a block diagram showing internal configurations of the pet robot and the station shown in FIG. 21.

As shown in FIG. 22, the pet robot 1 has a communication interface (that is, the first connector half) 140 in addition to the above described configuration shown in FIG. 2 (almost omitted in FIG. 22). Furthermore, the station 130 is configured by connecting a memory section 133, a display section 134, an input section 135 and information synchronizing button 136 to a CPU 132 to which a communication interface (that is, the second connector half) is connected.

Stored in the memory section 133 of the station 130 is data which is identical to that in the external memory 14B in the body member unit 2 so that a user can input map information, command information and a time, for example, by operating the input section 135 at a charging time of the pet robot 1. At this time, the display section 134 is capable of displaying internal information such as diary and feeling values of the pet robot 1 as the input section 135 is operated by the user.

When the user manipulates an information synchronizing button 136 which is added to the above described configuration, communication is started between the station 130 and the pet robot 1, and information identical to that in the memory section 133 is transferred to the external memory 14B in the pet robot 1. At this time, the above described internal information such as the diary and feeling values is transferred from the external memory 14B in the pet robot 1 to the memory section 133. By manipulating the information synchronizing button 136 as described above, various kinds of information is synchronously transferred between the pet robot 1 and the station 130, thereby updating both the pet robot 1 and the station 130.

When the pet robot 1 is configured as described above, the station 130 can have a function to back up the external memory 14B in the pet robot 1 at a time of charging which is required periodically, thereby facilitating to expand a capacity of the external memory 14B of the pet robot 1.

The present invention is configured to dispose selecting means for selecting a transmission destination and transmitting means for transmitting predetermined information to the transmission destination selected by the above described selecting means as described above, thereby making it possible to realize a robot apparatus which is capable of remarkably enhancing a probability of notification by selecting the transmission destination and further improving an amusement property by increasing occasions to receive the above described notification.

Furthermore, the present invention is configured to dispose information acquiring means for acquiring information of a surrounding environment and/or an internal state, and transmitting means for transmitting information acquired by the above described information acquiring means to a predetermined transmission destination, thereby making it possible to realize a robot apparatus which is capable of communicating with the transmission destination even when the transmission destination is not at a short distance and remarkably enhancing an amusement property.

Furthermore, the present invention is configured to select a transmission destination and then transmit predetermined information to the above described transmission destination, thereby making it possible to realize a control method for robot apparatus which is remarkably enhancing a probability of notification by selecting the transmission destination and further improving an amusement proper by of a robot apparatus by increasing occasions to receive the above described notification.

Furthermore, the present invention is configured to acquire information of a surrounding environment and/or an internal state and then transmit the above described acquired information to a predetermined transmission destination, thereby making it possible to realize a control method for robot apparatus which allows a robot apparatus to communicate with the transmission destination even when the transmission destination is not at a short distance and further improving an amusement property.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A robot apparatus comprising:
   selecting means for selecting a transmission destination; and
   transmitting means for transmitting predetermined information to said transmission destination selected by said selecting means;
   wherein said predetermined information comprises a self-diagnostic result indicating an abnormality of said robot apparatus.

2. The robot apparatus according to claim 1, further comprising:
   format converting means for converting said predetermined information into a format corresponding to said transmission destination.

3. A robot apparatus comprising:
   selecting means for selecting a transmission destination; and
   transmitting means for transmitting predetermined information to said transmission destination selected by said selecting means;
   wherein said selecting means selects a second transmission destination which is different than a first transmission destination previously selected when transmission of said predetermined information from said transmitting means to said first transmission destination fails.

4. A robot apparatus comprising:
   self-diagnosis means for detecting an abnormality of the robot apparatus and providing a self-diagnostic result; and
   transmitting means for transmitting said self-diagnostic result to a predetermined transmission destination remote from said robot apparatus.

5. The robot apparatus according to claim 4, further comprising:
   receiving means for receiving a command given by an external appliance, wherein said self-diagnosis means acquires said self-diagnostic result in correspondence to said command given by said external appliance.

6. The robot apparatus according to claim 4 wherein said transmitting means transmits said information at random.

7. A robot apparatus comprising:
   information acquiring means for acquiring information of a surrounding environment and/or an internal state;
   transmitting means for transmitting said information acquired by said information acquiring means to a predetermined transmission destination; and
   receiving means for receiving a command from an external appliance;
   wherein said command is described in a natural language, and said information acquiring means analyzes said command on the basis of said natural language and acquires said information of said surrounding environment and/or internal state in accordance with a result of said analysis.

8. A robot apparatus comprising:
   information acquiring means for acquiring information of a surrounding environment and/or an internal state; and
   transmitting means for transmitting said information acquired by said information acquiring means to a predetermined transmission destination;
   wherein said information acquiring means spontaneously acquires said information of said surrounding environment and/or internal state.

9. A robot apparatus comprising:
   information acquiring means for acquiring information of a surrounding environment and/or an internal state; and
   transmitting means for transmitting said information acquired by said information acquiring means to a predetermined transmission destination when the surrounding environment and/or internal state changes beyond a predetermined level.

10. A robot apparatus comprising:
    information acquiring means for acquiring information of a surrounding environment and/or an internal state; and
    transmitting means for transmitting said information acquired by said information acquiring means to a predetermined transmission destination at a predetermined time.

11. A control method for robot apparatus comprising:
    selecting a transmission destination; and
    transmitting predetermined information comprising a self-diagnostic result indicating an abnormality of said robot apparatus to said selected transmission destination.

12. The control method for robot apparatus according to claim 11 wherein said predetermined information is converted into a format corresponding to said transmission destination and said predetermined information after said format conversion is transmitted to said selected transmission destination at said transmitting step.

13. A control method for robot apparatus comprising:

selecting a first transmission destination;

transmitting predetermined information to said selected transmission destination; and selecting a second transmission destination when transmission of said predetermined information to said first transmission destination fails, then transmitting said predetermined information to said second transmission destination.

14. A control method for robot apparatus comprising:

self-diagnosing said robot apparatus to detect an abnormality thereof and provide a self-diagnostic result; and transmitting said self-diagnostic result to a predetermined transmission destination remote from said robot apparatus.

15. The control method for robot apparatus according to claim 14 wherein said self-diagnosing is performed in accordance with a command received from an external appliance.

16. The control method for robot apparatus according to claim 14 wherein said information is transmitted at random at said transmitting step.

17. A control method for robot apparatus comprising:

acquiring information of a surrounding environment and/or an internal state; and transmitting said acquired information to a predetermined transmission destination;

wherein said command is described in a natural language, and contents of said command are analyzed on the basis of said natural language and said information of said surrounding environment and/or internal state is acquired in accordance with a result of said command analysis.

18. A control method for robot apparatus comprising:

spontaneously acquiring information of a surrounding environment and/or an internal state; and transmitting said acquired information to a predetermined transmission destination.

19. A control method for robot apparatus comprising:

acquiring information of a surrounding environment and/or an internal state; and transmitting said acquired information to a predetermined transmission destination when said surrounding environment and/or internal state changes beyond a predetermined level.

20. A control method for robot apparatus comprising:

acquiring information of a surrounding environment and/or an internal state; and transmitting said acquired information to a predetermined transmission destination at a predetermined time.

* * * * *